US012112706B2

(12) United States Patent
Yanase et al.

(10) Patent No.: US 12,112,706 B2
(45) Date of Patent: Oct. 8, 2024

(54) PIXEL CIRCUIT CONFIGURED TO CONTROL LIGHT-EMITTING ELEMENT

(71) Applicant: WUHAN TIANMA MICRO-ELECTRONICS CO., LTD., Wuhan (CN)

(72) Inventors: Jiro Yanase, Kanagawa (JP); Yojiro Matsueda, Kanagawa (JP)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/308,829

(22) Filed: Apr. 28, 2023

(65) Prior Publication Data

US 2023/0267889 A1 Aug. 24, 2023

Related U.S. Application Data

(62) Division of application No. 17/867,254, filed on Jul. 18, 2022, now Pat. No. 11,676,539.

(30) Foreign Application Priority Data

Jul. 21, 2021 (JP) ................................ 2021-120819
Apr. 13, 2022 (JP) ................................ 2022-066566

(51) Int. Cl.
*G09G 3/325* (2016.01)

(52) U.S. Cl.
CPC ....... *G09G 3/325* (2013.01); *G09G 2320/046* (2013.01); *G09G 2330/021* (2013.01)

(58) Field of Classification Search
CPC ............. G09G 3/325; G09G 2320/046; G09G 2330/021; G09G 2230/00;
(Continued)

(56) References Cited

U.S. PATENT DOCUMENTS 10,783,830 B1 9/2020 Lu
11,462,151 B2 10/2022 Hashimoto
(Continued)

FOREIGN PATENT DOCUMENTS

CN 101123070 A 2/2008
CN 101256732 A 9/2008
(Continued)

OTHER PUBLICATIONS

Office Action with concise explanation, issued in Chinese Patent Application No. 202210797840 dated Mar. 12, 2024.
(Continued)

*Primary Examiner* — Rodney Amadiz
(74) *Attorney, Agent, or Firm* — NIXON & VANDERHYE

(57) ABSTRACT

A driving transistor is configured to control driving current for the light-emitting element. A first capacitive element and a second capacitive element are connected in series between a gate and a source of the driving transistor. A first switching transistor is configured to switch connection/disconnection between a data line and an intermediate node located between the first capacitive element and the second capacitive element. A second switching transistor is configured to switch connection/disconnection between the gate and a drain of the driving transistor. A third switching transistor is configured to switch connection/disconnection between the intermediate node and a reference power line. A fourth switching transistor is configured to switch supply/non-supply of driving current from the driving transistor to the light-emitting element. A fifth switching transistor is configured to switch connection/disconnection between an anode of the light-emitting element and a reset power line.

7 Claims, 28 Drawing Sheets

(58) Field of Classification Search
CPC ... G09G 2300/0819; G09G 2300/0852; G09G 2310/0216; G09G 2310/0251; G09G 2310/061; G09G 2320/0219; G09G 2320/0257; G09G 3/3241; G09G 3/3233; G09G 2310/0264
See application file for complete search history.

(56) References Cited

U.S. PATENT DOCUMENTS

| | | | | |
|---|---|---|---|---|
| 2008/0036710 | A1 | 2/2008 | Kim | |
| 2008/0211747 | A1 | 9/2008 | Kim | |
| 2015/0371590 | A1* | 12/2015 | Jeong | G09G 3/3291 345/82 |
| 2018/0005575 | A1 | 1/2018 | Lee et al. | |
| 2018/0006263 | A1 | 1/2018 | Yoon et al. | |
| 2018/0211599 | A1 | 7/2018 | Li et al. | |
| 2018/0301092 | A1 | 10/2018 | Ma | |
| 2020/0342812 | A1 | 10/2020 | Xu | |
| 2020/0389157 | A1 | 12/2020 | Yanase et al. | |
| 2021/0005138 | A1 | 1/2021 | Umezawa | |
| 2021/0201759 | A1 | 7/2021 | Cho | |
| 2021/0201778 | A1 | 7/2021 | Kawachi | |
| 2022/0319417 | A1 | 10/2022 | Liu et al. | |
| 2022/0375408 | A1 | 11/2022 | Dong | |

FOREIGN PATENT DOCUMENTS

| | | | |
|---|---|---|---|
| CN | 105427803 | A | 3/2016 |
| CN | 106952615 | A | 7/2017 |
| CN | 110914894 | A | 3/2020 |
| CN | 111477179 | A | 7/2020 |
| CN | 111951726 | A | 11/2020 |
| CN | 112970055 | A | 6/2021 |
| CN | 113129818 | A | 7/2021 |
| JP | 2004-246204 | A | 9/2004 |
| KR | 20180078109 | A | 7/2018 |
| WO | 2019014939 | A1 | 1/2019 |
| WO | 2019186857 | A1 | 10/2019 |

OTHER PUBLICATIONS

Le Hai et al., “Patent analysis of OLED pixel circuit threshold compensation”, Scientist, No. 11, Sep. 8, 2016, pp. 1-2.

* cited by examiner

INITIALIZATION PERIOD

Vth COMPENSATION PERIOD

Vth COMPENSATION PERIOD

RELATED EXAMPLE

RELATED EXAMPLE

PIXEL CIRCUIT CONFIGURED TO CONTROL LIGHT-EMITTING ELEMENT

CROSS-REFERENCE TO RELATED APPLICATIONS

This application is a Divisional of copending application Ser. No. 17/867,254, filed on Jul. 18, 2022, which claims priority under 35 U.S.C. § 119(a) to Application No. 2021-120819, filed in Japan on Jul. 21, 2021 and Application No. 2022-066566, filed in Japan on Apr. 13, 2022, all of which are hereby expressly incorporated by reference into the present application.

BACKGROUND

This disclosure relates to a pixel circuit configured to control a light-emitting element.

An organic light-emitting diode (OLED) element is a current-driven self-light-emitting element and therefore, does not need a backlight. In addition to this, the OLED element has advantages for achievement of low power consumption, wide viewing angle, and high contrast ratio; it is expected to contribute to development of flat panel display devices.

An active-matrix (AM) OLED display device includes transistors for selecting pixels and driving transistors for supplying electric current to the pixels. The transistors in an OLED display device are thin-film transistors (TFTs); commonly, low-temperature polysilicon (LTPS) TFTs are used.

The TFTs have variations in their threshold voltage and charge mobility. Since the driving transistors determine the light emission intensity of the OLED display device, their variations in electrical characteristics cause uneven brightness. Hence, a typical OLED display device includes an adjustment circuit for compensating for the variations and shifts of the threshold voltage of the driving transistors.

An OLED display device could show a ghost image and this phenomenon is called image retention. For example, in displaying a full-screen image of an intermediate emission level after displaying a black and white checkerboard pattern for a specific period, the OLED display device displays a ghost image of the checkerboard pattern of different emission levels for a while.

This is caused by hysteresis effect of the driving transistors. The hysteresis effect causes a phenomenon such that the drain current in a field-effect transistor flows differently between the case where the gate-source voltage changes from a high voltage to a low voltage and the case where the gate-source voltage changes from the low voltage to the high voltage.

That is to say, the drain current flows differently between the pixels whose emission level is changed from the black level to an intermediate level and the pixels whose emission level is changed from the white level to the intermediate level. For this reason, the OLED display device emits different intensities of light. This difference in drain current lasts over several frames and therefore, the difference in intensity of emitted light is perceived as a ghost. This behavior of the drain current is explained by current transient response characteristics by hysteresis effect.

SUMMARY

An aspect of this disclosure is a pixel circuit configured to control light emission of a light-emitting element, the pixel circuit including: a light-emitting element; a driving transistor configured to control driving current for the light-emitting element; a first capacitive element and a second capacitive element connected in series between a gate and a source of the driving transistor; a first switching transistor configured to switch connection/disconnection between a data line and an intermediate node located between the first capacitive element and the second capacitive element; a second switching transistor configured to switch connection/disconnection between the gate and a drain of the driving transistor; a third switching transistor configured to switch connection/disconnection between the intermediate node and a reference power line; a fourth switching transistor configured to switch supply/non-supply of driving current from the driving transistor to the light-emitting element; and a fifth switching transistor configured to switch connection/disconnection between an anode of the light-emitting element and a reset power line, wherein, during an initialization period, the first switching transistor is OFF and the second switching transistor, the third switching transistor, the fourth switching transistor, and the fifth switching transistor are ON, wherein, during a threshold compensation period following the initialization period, the first switching transistor and the fourth switching transistor are OFF and the second switching transistor, the third switching transistor, and the fifth switching transistor are ON, wherein, during a data write period following the threshold compensation period, the first switching transistor is ON and the second switching transistor, the third switching transistor, the fourth switching transistor, and the fifth switching transistor are OFF, and wherein, during an emission period following the data write period, the fourth switching transistor is ON and the first switching transistor, the second switching transistor, the third switching transistor, and the fifth switching transistor are OFF.

An aspect of this disclosure is a pixel circuit configured to control light emission of a light-emitting element, the pixel circuit including: a light-emitting element; a driving transistor configured to control driving current for the light-emitting element; a third capacitive element and a fourth capacitive element connected in series between a gate and a source of the driving transistor; a sixth switching transistor configured to switch connection/disconnection between the gate of the driving transistor and a data line; a seventh switching transistor configured to switch supply/non-supply of electric current from a positive power line to the driving transistor; a connection line connecting an intermediate node located between the driving transistor and the seventh switching transistor and an intermediate node located between the third capacitive element and the fourth capacitive element; an eighth switching transistor configured to switch connection/disconnection between the gate of the driving transistor and a reference power line; a ninth switching transistor configured to switch supply/non-supply of electric current from the driving transistor to the light-emitting element; and a tenth switching transistor configured to switch connection/disconnection between a reset power line and an intermediate node located between the driving transistor and the ninth switching transistor, wherein, during an initialization period, the sixth switching transistor is OFF and the seventh switching transistor, the eighth switching transistor, the ninth switching transistor, and the tenth switching transistor are ON, wherein, during a threshold compensation period following the initialization period, the eighth switching transistor and the tenth switching transistor are ON and the sixth switching transistor, the seventh switching transistor, and the ninth switching transistor are OFF, wherein, during a data write period following the threshold compensation period, the sixth switching transistor is ON and the seventh switching transistor, the eighth switching transistor, the ninth switching transistor, and the tenth switching transistor are OFF, and wherein, during an emission period following the data write period, the seventh switching transistor and the ninth switching transistor are ON and the sixth switching transistor, the eighth switching transistor, and the tenth switching transistor are OFF.

An aspect of this disclosure is a pixel circuit configured to control light emission of a light-emitting element, the pixel circuit including: a light-emitting element; a driving transistor configured to control driving current for the light-emitting element; a fifth capacitive element and a sixth capacitive element connected in series between a gate and a source of the driving transistor; an eleventh switching transistor configured to switch connection/disconnection between a data line and an intermediate node located between the fifth capacitive element and the sixth capacitive element; a twelfth switching transistor configured to switch supply/non-supply of electric current from a positive power line to the driving transistor; a thirteenth switching transistor configured to switch connection/disconnection between the gate of the driving transistor and a reference power line; a fourteenth switching transistor configured to switch connection/disconnection between an intermediate node located between the driving transistor and the twelfth switching transistor and the intermediate node located between the fifth capacitive element and the sixth capacitive element; and a fifteenth switching transistor configured to switch connection/disconnection between an anode of the light-emitting element and a reset power line, wherein, during an initialization period, the eleventh switching transistor is OFF and the twelfth switching transistor, the thirteenth switching transistor, the fourteenth switching transistor, and the fifteenth switching transistor are ON, wherein, during a threshold compensation period following the initialization period, the eleventh switching transistor and the twelfth switching transistor are OFF and the thirteenth switching transistor, the fourteenth switching transistor, and the fifteenth switching transistor are ON, wherein, during a data write period following the threshold compensation period, the eleventh switching transistor is ON and the twelfth switching transistor, the thirteenth switching transistor, the fourteenth switching transistor, and the fifteenth switching transistor are OFF, and wherein, during an emission period following the data write period, the twelfth switching transistor is ON and the eleventh switching transistor, the thirteenth switching transistor, the fourteenth switching transistor, and the fifteenth switching transistor are OFF.

It is to be understood that both the foregoing general description and the following detailed description are exemplary and explanatory and are not restrictive of this disclosure.

EMBODIMENTS

Figure 1:
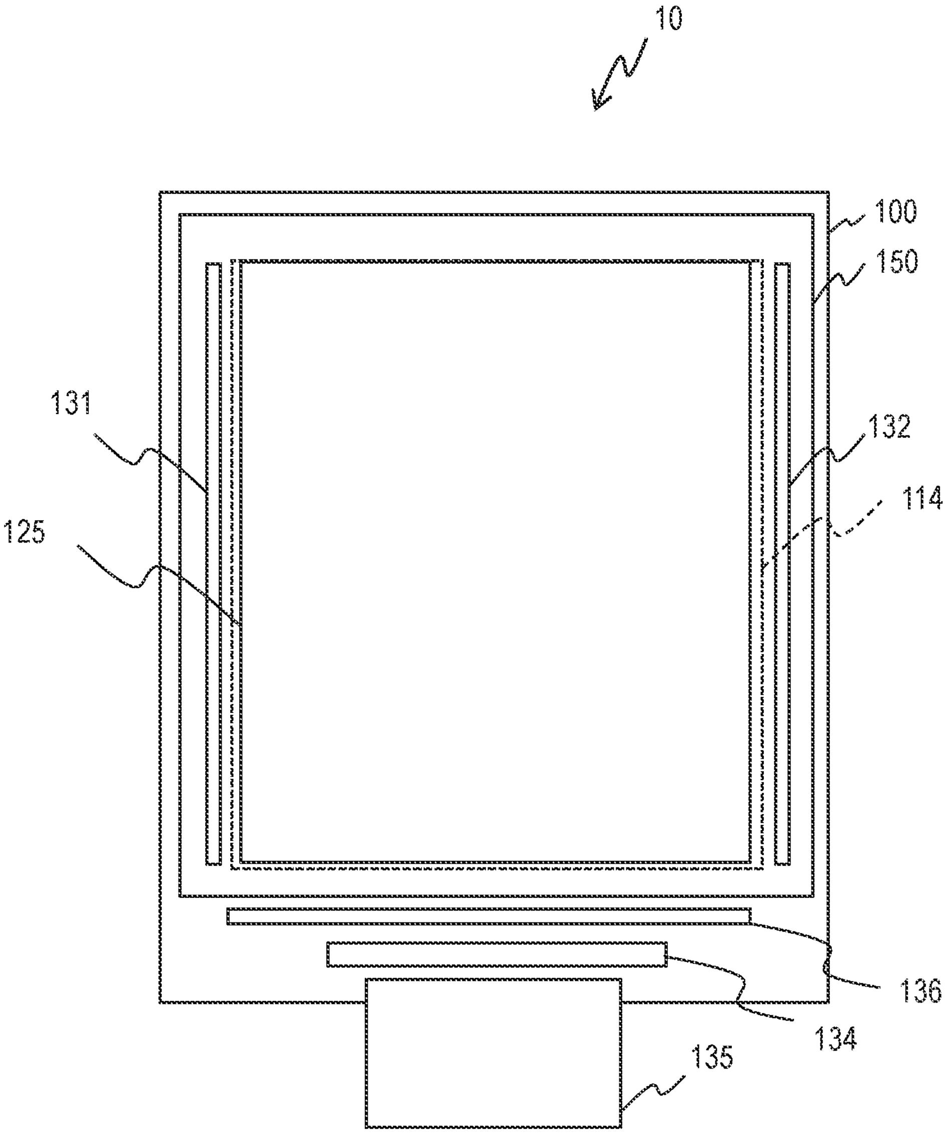
FIG. 1 schematically illustrates a configuration example of an OLED display device of a display device.

Hereinafter, embodiments of this disclosure will be specifically described with reference to the accompanying drawings. Elements common to the drawings are denoted by the same reference signs and each element in the drawings may be exaggerated in size and/or shape for clear understanding of the description.

Disclosed in the following are techniques to improve the driving current control in an electro-luminescent display device, more specifically, techniques to diminish image retention in an electro-luminescent display device. The electro-luminescent display device is a display device utilizing light-emitting elements that emit light in response to driving current, like an organic light-emitting diode (OLED) display device.

Configuration of Display Device

FIG. 1 schematically illustrates a configuration example of an OLED display device 10 of a display device. The horizontal direction in FIG. 1 is an X-axis direction and the vertical direction is a Y-axis direction, which is perpendicular to the X-axis direction. The OLED display device 10 includes a thin-film transistor (TFT) substrate 100 on which OLED elements (organic light-emitting elements) are formed, an encapsulation substrate 150 for encapsulating the OLED elements.

The space between the TFT substrate 100 and the encapsulation substrate 150 is filled with an inactive gas such as dry nitrogen and sealed up. In place of the encapsulation substrate 150, a structural encapsulation unit having a different structure, such as a structural encapsulation unit utilizing thin-film encapsulation, can be employed.

In the periphery of a cathode electrode region 114 outer than the display region 125 of the TFT substrate 100, scanning circuits 131 and 132, a driver IC 134, and a demultiplexer 136 are provided. The driver IC 134 is connected to the external devices via flexible printed circuits (FPC) 135. The scanning circuits 131 and 132 drive scanning lines on the TFT substrate 100.

The driver IC 134 is mounted with an anisotropic conductive film (ACF), for example. The driver IC 134 provides power and timing signals (control signals) to the scanning circuits 131 and 132 and further, provides a data signal to the demultiplexer 136.

The demultiplexer 136 outputs output of one pin of the driver IC 134 to d data lines in series (d is an integer greater than 1). The demultiplexer 136 changes the output data line for the data signal from the driver IC 134 *d* times per scanning period to drive d times as many data lines as output pins of the driver IC 134.

The display region 125 includes a plurality of OLED elements (pixels) and a plurality of pixel circuits for controlling light emission of the plurality of pixels. In an example of a color OLED display device, each OLED element emits light in one of the colors of red, blue, and green. The plurality of pixel circuits constitute a pixel circuit array.

As will be described later, each pixel circuit includes a driving TFT (driving transistor) and a storage capacitor for storing signal voltage to determine the driving current of the driving TFT. The data signal transmitted by a data line is adjusted for the threshold voltage Vth of the driving TFT and stored to the storage capacitor. The voltage of the storage capacitor determines the gate voltage (Vgs) of the driving TFT. The adjusted control voltage in the storage capacitor changes the conductance of the driving TFT in an analog manner to supply a forward bias current corresponding to the light emission level to the OLED element.

Configuration of Pixel Circuit

Figure 2:
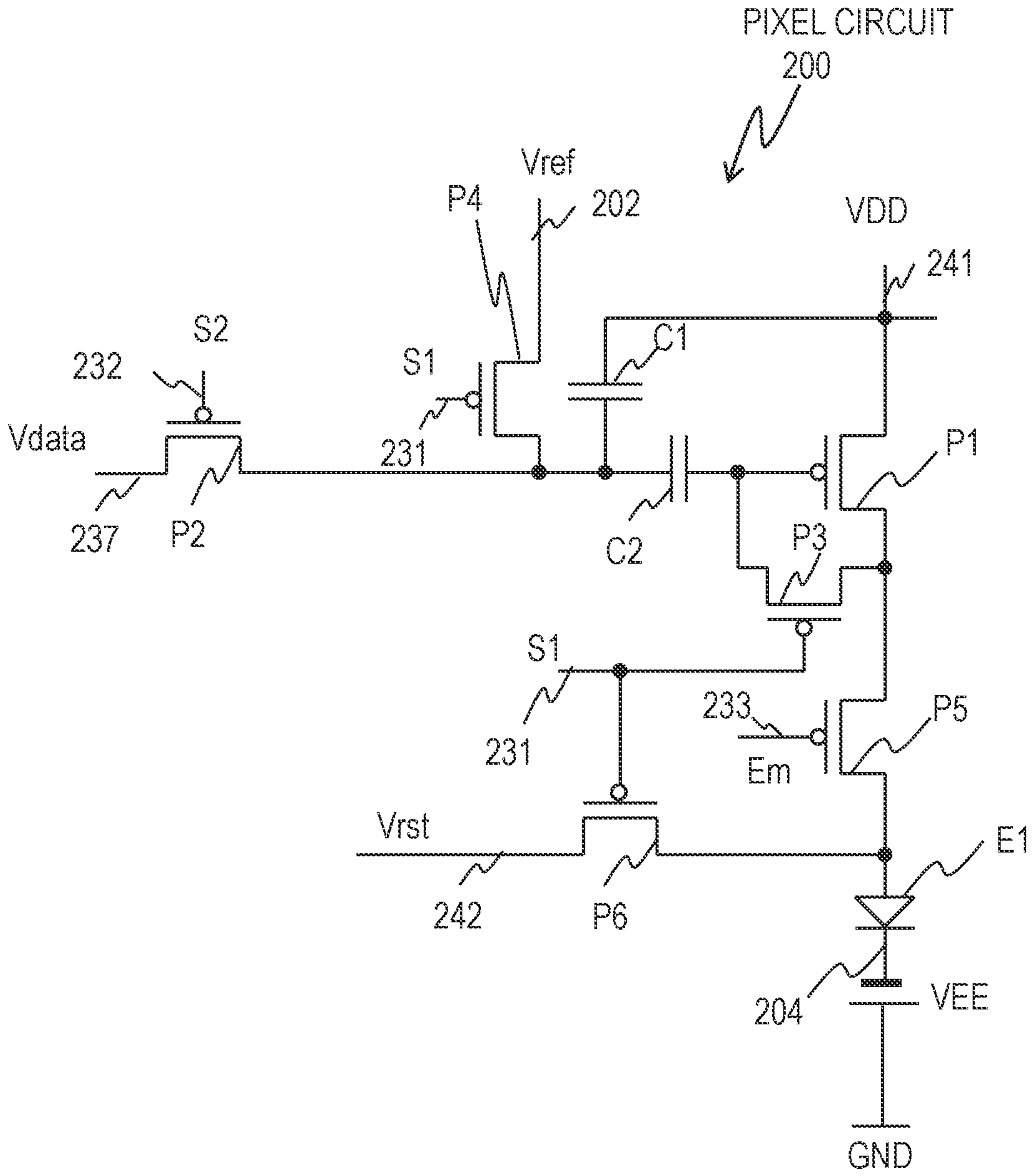
FIG. 2 illustrates a configuration example of a pixel circuit and control signals therefor in an embodiment of this specification.

FIG. 2 illustrates a configuration example of a pixel circuit 200 and control signals therefor in an embodiment of this specification. The pixel circuit 200 is included in a k-th pixel circuit row (k is an integer). The pixel circuit 200 includes six transistors (TFTs) P1 to P6 each having a gate, a source, and a drain. All transistors P1 to P6 in this example are p-type TFTs. The p-type TFTs can be low-temperature polysilicon TFTs. The transistor P2, the transistor P3, the transistor P4, the transistor P5, and the transistor P6 are a first switching transistor, a second switching transistor, a third switching transistor, a fourth switching transistor, and a fifth switching transistor, respectively.

The transistor P1 is a driving transistor for controlling the amount of electric current to an OLED element E1. The source of the driving transistor P1 is connected to a power line 241 for transmitting a positive power supply potential VDD. The driving transistor P1 controls the amount of electric current to be supplied from the power line 241 to the OLED element E1 in accordance with the voltage stored in storage capacitive elements C1 and C2 connected in series. The storage capacitive elements C1 and C2 retain the written voltage throughout one frame period. The cathode of the OLED element E1 is connected to a power line 204 for transmitting a negative power supply potential VEE from a cathode power supply. The storage capacitive elements C1 and C2 are a first capacitive element and a second capacitive element, respectively.

The capacitive elements C1 and C2 are connected in series between the power line 241 for transmitting the positive power supply potential VDD and the gate of the driving transistor P1. An end of the capacitive element C1 is connected to the power line 241 and the other end of the capacitive element C1 is connected to an end of the capacitive element C2. The other end of the capacitive element C2 is connected to the gate of the driving transistor P1. The source/drain of the transistor P4 and the source/drain of the transistor P2 are connected to an intermediate node between the capacitive elements C1 and C2.

The composite capacitor of the series storage capacitive elements C1 and C2 stores the voltage between the gate of the driving transistor P1 and the power line 241 or the source of the driving transistor P1. The source of the driving transistor P1 is connected to the power line 241; the source potential is at the positive power supply potential VDD. Accordingly, the storage capacitive elements C1 and C2 store the gate-source voltage of the driving transistor P1.

The transistor P5 is an emission control switching transistor for controlling ON/OFF of supply of driving current to the OLED element E1 and the resulting light emission of the OLED element E1. The source of the transistor P5 is connected to the drain of the driving transistor P1. The transistor P5 switches ON/OFF the current supply to the OLED element E1 connected from its drain. The gate of the transistor P5 is connected to a control signal line 233 for transmitting an emission control signal Em and the transistor P5 is controlled by the emission control signal Em from the scanning circuit 132. The emission control signal is a selection signal for controlling light emission of the OLED element E1.

The transistor P6 works to supply a reset potential Vrst to the anode of the OLED element E1. One end of the source/drain of the transistor P6 is connected to a power line 242 for transmitting the reset potential Vrst and the other end is connected to the anode of the OLED element E1. The reset potential Vrst can be equal to the negative power supply potential VEE. Then, a transmission line (power line) can be shared between the reset potential Vrst and the negative power supply potential VEE.

The gate of the transistor P6 is connected to a control signal line 231 for transmitting a selection signal S1 and the transistor P6 is controlled by the selection signal S1. When the transistor P6 is turned ON by the selection signal S1 from the scanning circuit 131, the transistor P6 supplies the reset potential Vrst transmitted by the power line 242 to the anode of the OLED element E1. The transistors P5 and P6 also supply the reset potential Vrst to the gate of the driving transistor P1 via the transistor P3.

The transistor P3 is a switching transistor (threshold compensation transistor) for writing a voltage for applying threshold calibration (threshold compensation) to the driving transistor P1 to the storage capacitive elements C1 and C2 and is also a transistor for resetting the gate potential of the driving transistor P1. The source and the drain of the transistor P3 connect the gate and the drain of the driving transistor P1. Accordingly, when the transistor P3 is ON, the driving transistor P1 is diode connected.

The transistor P4 is used to write a voltage for applying threshold compensation to the driving transistor P1 to the storage capacitive elements C1 and C2. The transistor P4 controls whether to supply a reference potential Vref to the storage capacitive elements C1 and C2. The reference potential Vref can be equal to the positive power supply potential VDD. Then, a transmission line (power line) can be shared between the reference potential Vref and the positive power supply potential VDD. One end of the source/drain of the transistor P4 is connected to a power line 202 for transmitting the reference potential Vref and the other end is connected to an intermediate node between the capacitive elements C1 and C2. The gate of the transistor P4 is connected to the control signal line 231 for transmitting the selection signal S1 and the transistor P4 is controlled by the selection signal S1 input from the scanning circuit 131 to its gate.

The transistors P3, P6, and P4 are controlled by the selection signal S1. Accordingly, these transistors P3, P6, and P4 are turned ON/OFF simultaneously. In the period where these transistors are ON, the transistor P5 is turned ON to reset the gate potential of the driving transistor P1 and then turned OFF. When the transistors P3 and P4 are ON, the transistor P1 is a diode-connected transistor. A threshold compensation voltage based on the positive power supply potential VDD and the reference potential Vref is written to the storage capacitive elements C1 and C2.

The transistor P2 is a switching transistor for selecting a pixel circuit to be supplied with a data signal and writing the data signal (data signal voltage) Vdata to the storage capacitive elements C1 and C2. One end of the source/drain of the transistor P2 is connected to the storage capacitive elements C1 and C2 and the other end is connected to a data line 237 for transmitting the data signal Vdata.

The gate of the transistor P2 is connected to a control signal line 232 for transmitting a selection signal S2 from the scanning circuit 131. The transistor P2 is controlled by the selection signal S2. The selection signal S2 is a signal different from the selection signal S1. For the pixel circuit 200, the selection signal S2 is a selection signal for controlling supply of the data signal Vdata to the storage capacitive elements C1 and C2. When the transistor P2 is ON, the transistor P2 supplies the data signal Vdata supplied from the driver IC 134 through the data line 237 to the storage capacitive elements C1 and C2.

Operation of Pixel Circuit

Figure 3:
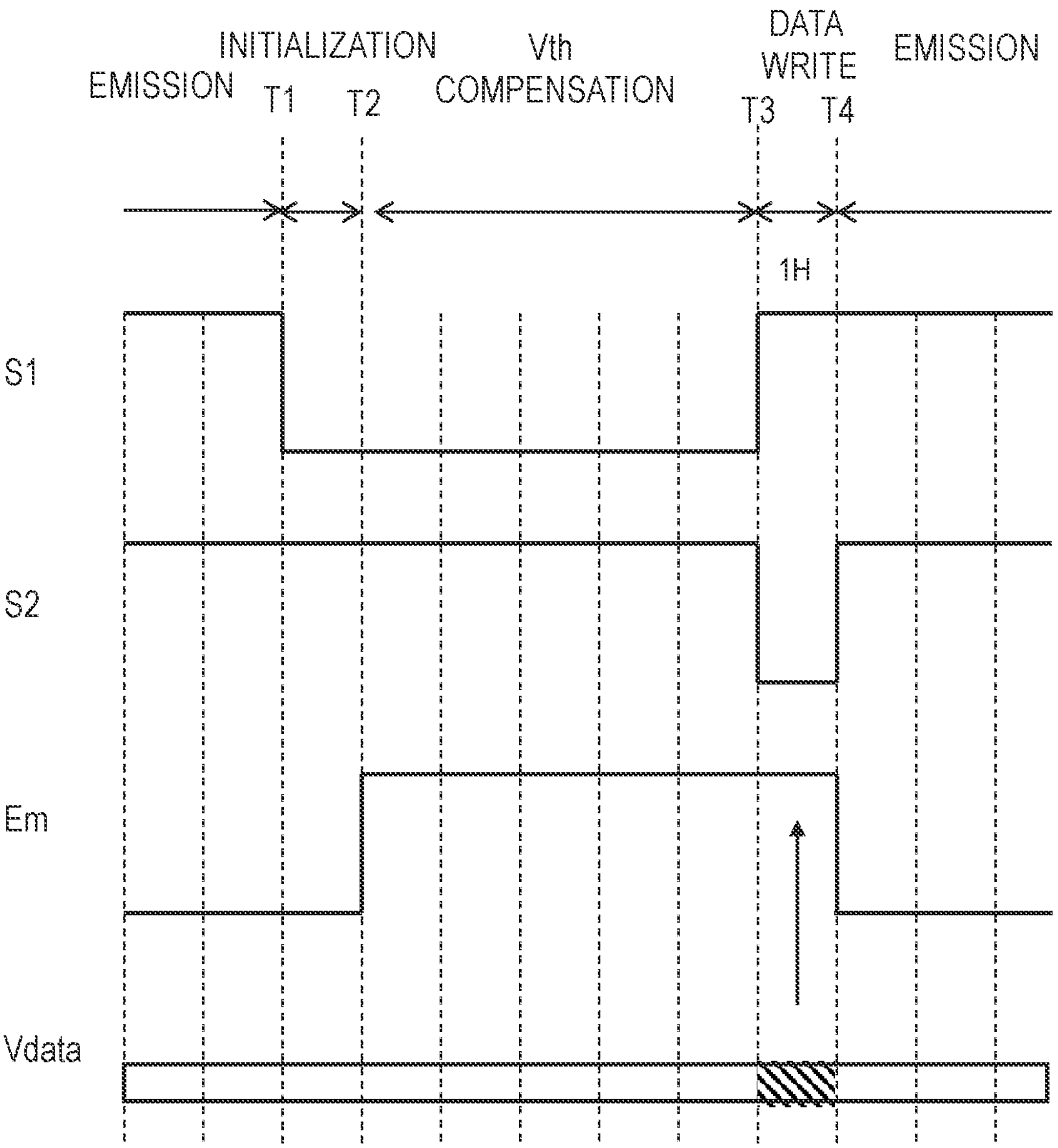
FIG. 3 is a timing chart of the signals for controlling the pixel circuit illustrated in FIG. 2 for one frame period.

FIG. 3 is a timing chart of the signals for controlling the pixel circuit 200 illustrated in FIG. 2 for one frame period. FIG. 3 is a timing chart for selecting the k-th pixel circuit row and writing a data signal Vdata to the pixel circuit 200. Specifically, the signals illustrated in FIG. 3 are the selection signal S1, the selection signal S2, the emission control signal Em, and the data signal Vdata.

The period prior to a time T1 is an emission period. The selection signals S1 and S2 are High and the emission control signal Em is Low. During this period, the transistor P5 is ON and the remaining transistors are OFF. Accordingly, the voltage stored in the composite capacitor of the series storage capacitive elements C1 and C2 causes driving current to be supplied from the power line 241 to the OLED element E1 via the driving transistor P1 and the transistor P5, so that the OLED element E1 emits light.

The period from the time T1 to a time T2 is an initialization period. At the time T1, the selection signal S1 changes from High to Low. The selection signal S2 remains High and the emission control signal Em remains Low. The transistors P3, P4, and P6 turn ON at the time T1. The transistor P2 remains OFF and the transistor P5 remains ON.

Figure 4A:
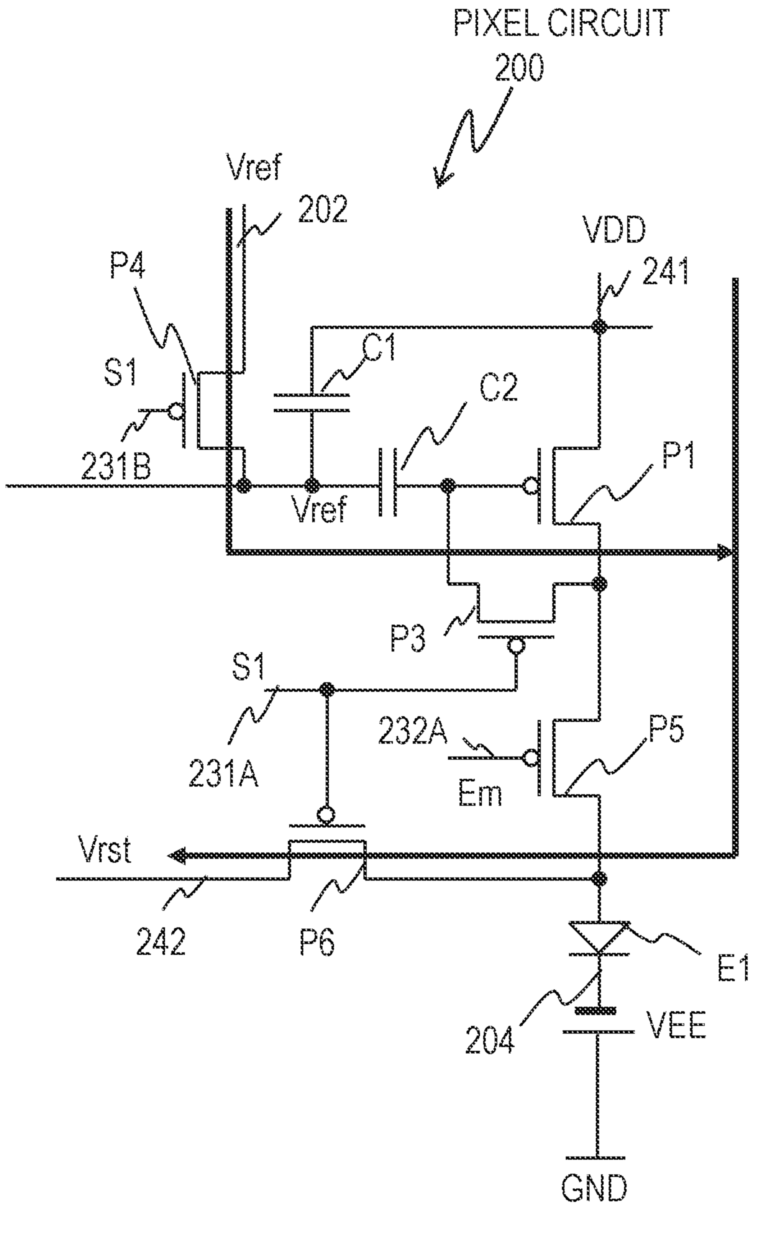
FIG. 4A illustrates transistors being ON, potentials at some nodes, and flows of electric current in the pixel circuit illustrated in FIG. 2 in an initialization period.

FIG. 4A illustrates transistors being ON, potentials at some nodes, and flows of electric current in the pixel circuit 200 in the initialization period. A current flows from the transmission line 202 of the reference potential Vref to the transmission line 242 of the reset potential Vrst through the transistors P4, P3, P5, and P6. Another current flows from the transmission line 241 of the positive power supply potential VDD to the transmission line 242 of the reset potential Vrst through the transistors P1, P5, and P6.

The potential at the intermediate node between the capacitive elements C1 and C2 changes to the reference potential Vref. The electric charge stored in the capacitive element C2 is discharged to initialize (reset) the gate potential of the driving transistor P1. The gate potential of the driving transistor P1 changes to the reset potential Vrst. The reset potential Vrst supplied to the gate of the driving transistor P1 every frame resets the voltage corresponding to the emission level of the previous frame and reduces the hysteresis effect. Furthermore, the anode potential of the OLED element is initialized. The anode potential is lowered to the reset potential Vrst, which prevents the OLED element E1 from anomalously emitting light in the period other than the emission period.

Returning to FIG. 3, the emission control signal Em changes from Low to High at the time T2. The selection signal S1 remains Low and the selection signal S2 remains High. In response to the change of the emission control signal Em, the transistor P5 turns OFF. This state is maintained from the time T2 to a time T3. The period from the time T2 to the time T3 is a threshold voltage (Vth) compensation period for the driving transistor P1.

Figure 4B:
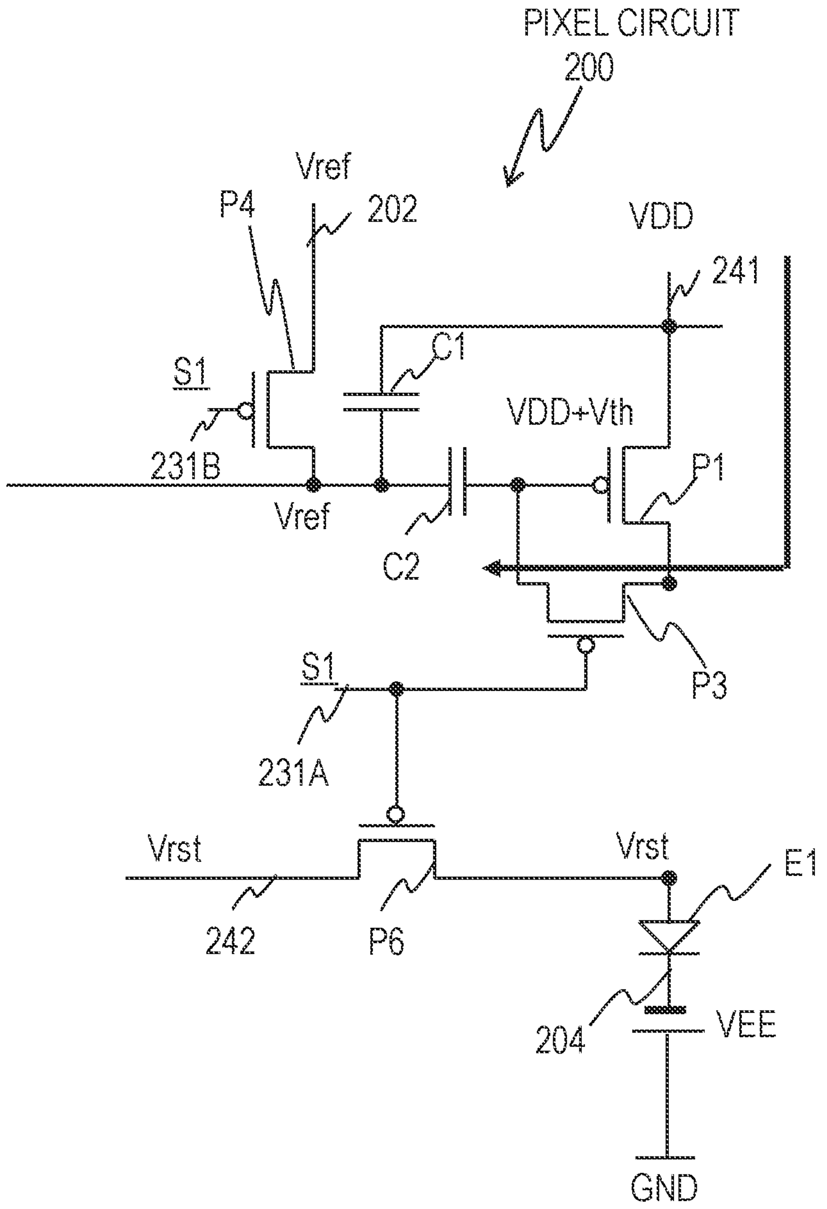
FIG. 4B illustrates transistors being ON, potentials at some nodes, and a flow of electric current in the pixel circuit illustrated in FIG. 2 in a Vth compensation period.

FIG. 4B illustrates transistors being ON, potentials at some nodes, and a flow of electric current in the pixel circuit 200 in the Vth compensation period (threshold compensation period). The transistor P3 remains ON; the drain and the gate of the driving transistor P1 are connected. The driving transistor P1 is in a diode-connected state. Electric current flows from the transmission line 241 of the positive power supply potential VDD to the capacitive element C2 through the transistors P1 and P3.

The gate-source voltage of the driving transistor P1 drops to the threshold voltage and the current stops. The source potential of the driving transistor P1 is the positive power supply potential VDD and the gate potential becomes a potential (VDD+Vth). The potential at the node between the capacitive elements C1 and C2 is the reference potential Vref.

Returning to FIG. 3, the selection signal S1 changes from Low to High and the selection signal S2 changes from High to Low at the time T3. The emission control signal Em remains High. The transistors P3, P4, and P6 turn OFF in response to the change of the selection signal S1. The transistor P2 turns ON in response to the change of the selection signal S2. Since the emission control signal Em remains High, the transistor P5 remains OFF. The period from the time T3 to a time T4 is a data write period to write a data signal to the storage capacitive elements C1 and C2.

Figure 4C:
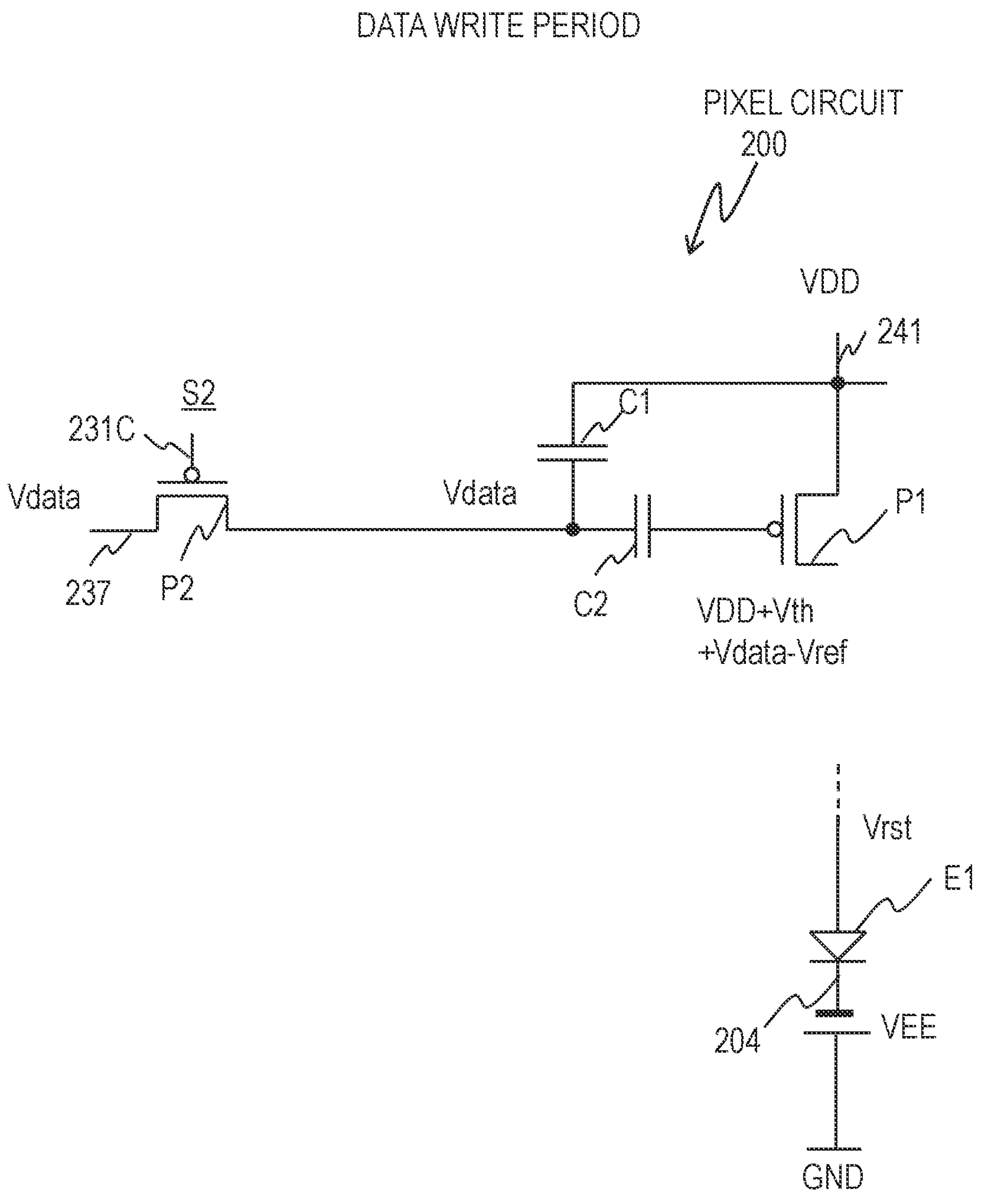
FIG. 4C illustrates transistors being ON and potentials at some nodes in the pixel circuit illustrated in FIG. 2 in a data write period.

FIG. 4C illustrates transistors being ON and potentials at some nodes in the pixel circuit 200 in the data write period. Only the transistor P2 is ON. The intermediate node between the capacitive elements C1 and C2 is supplied with a data signal (data potential) Vdata and its potential changes from the reference potential Vref to the data signal Vdata. The gate potential of the driving transistor P1 changes to (VDD+Vth+Vdata−Vref) in accordance with the law of conservation of charge.

Returning to FIG. 3, the selection signal S2 changes from Low to High and the emission control signal Em changes from High to Low at the time T4. The selection signal S1 remains High. The transistor P2 turns OFF in response to the change of the selection signal S2. The transistor P5 turns ON in response to the change of the emission control signal Em. The transistors P3, P4, and P6 remain OFF.

The period later than the time T4 is an emission period. The driving transistor P1 supplies driving current to the OLED element E1 through the transistor P5 in accordance with the voltage between the positive power supply potential VDD and the aforementioned potential (VDD+Vth+Vdata−Vref). This state continues to the time T1 of the next frame.

Defining the data write period (also referred to as one horizontal (1H) period) as a reference period, the initialization period in the example illustrated in FIG. 3 has a length equal to the length of the reference period. The Vth compensation period has a length longer than and an integral multiple of the reference period. The Vth compensation period in the example of FIG. 3 is six times as long as the reference period. This circuit allows adjustment of the length of the Vth compensation period without alteration of the data write period. Image retention can be effectively reduced by adjusting the Vth compensation period.

For example, the initialization period can be determined to have a length of 1H to 3H and the Vth compensation period can be determined to have a length of 3H to 40H. In other words, the Vth compensation period can be determined to be from 3 to 40 times as long as a data write period. As described above, the length of 1H is the length of a data write period, which can be approximately 3 μs.

Figure 5A:
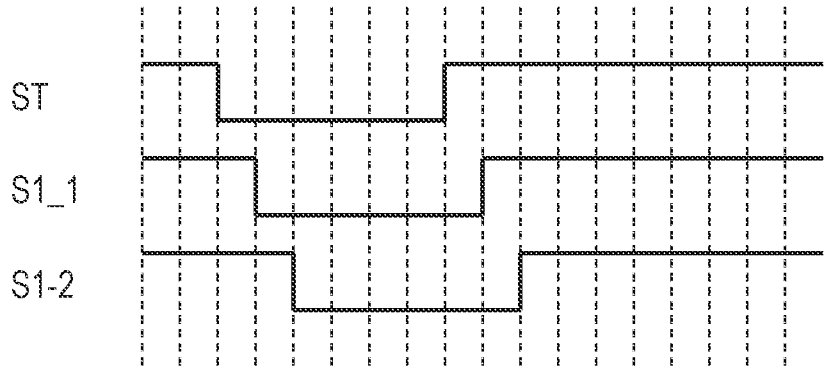
FIG. 5A illustrates temporal variations of a kind of selection signals for consecutive pixel rows.

FIG. 5A illustrates temporal variations of selection signals S1 for consecutive pixel rows. The selection signals S1 are successively output from a shift register circuit in the scanning circuit 131 to individual pixel rows. FIG. 5A illustrates temporal variations of a start pulse ST of the shift register circuit, a selection signal S1_1 for the first row, and a selection signal S1_2 for the second row. These selection signals S1 for individual rows are shifted by a unit time (1H period). The length of each selection signal S1 is the same as the one in the example in FIG. 3.

Figure 5B:
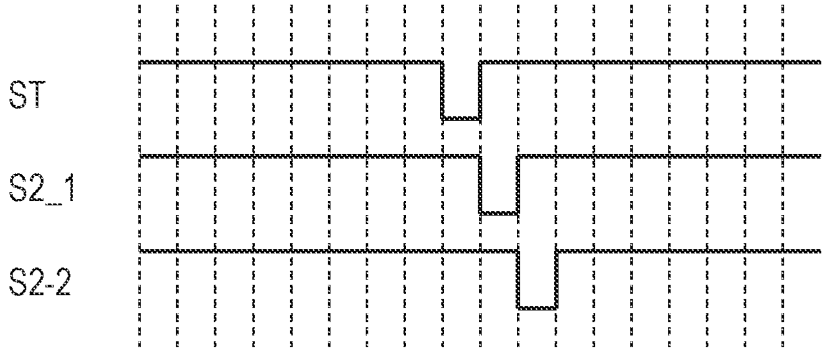
FIG. 5B illustrates temporal variations of another kind of selection signals for consecutive pixel rows.

FIG. 5B illustrates temporal variations of selection signals S2 for consecutive pixel rows. The selection signals S2 are successively output from a shift register circuit in the scanning circuit 131 to individual pixel rows. FIG. 5B illustrates temporal variations of a start pulse ST of the shift register circuit, a selection signal S2_1 for the first row, and a selection signal S2_2 for the second row. These selection signals S2 for individual rows are shifted by a unit time (1H period). The length of each selection signal S2 is the same as the one in the example in FIG. 3.

Figure 5C:
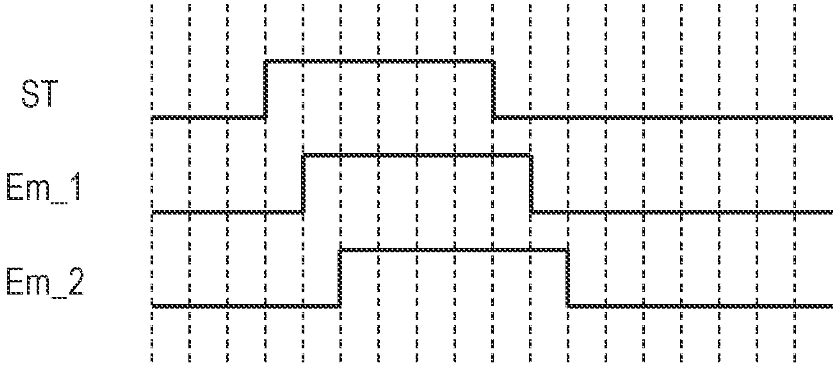
FIG. 5C illustrates temporal variations of emission control signals for consecutive pixel rows.

FIG. 5C illustrates temporal variations of emission control signals Em for consecutive pixel rows. The emission control signals Em are successively output from a shift register circuit in the scanning circuit 132 to individual pixel rows. FIG. 5C illustrates temporal variations of a start pulse ST of the shift register circuit, an emission control signal Em_1 for the first row, and an emission control signal Em_2 for the second row. These emission control signals Em for individual rows are shifted by a unit time (1H period). The length of each emission control signal Em is the same as the one in the example in FIG. 3.

The pixel circuit 200 described with reference to FIGS. 3 to 5C includes six transistors P1 to P6 and two capacitive elements C1 and C2 and is controlled by three kinds of control signals S1, S2, and Em. Because of this small circuit size and this small number of control signals, the pixel circuit 200 contributes to achievement of a slim bezel and high resolution, while effectively reducing the image retention.

As described above, the pixel circuit 200 resets the anode potential of the OLED element E1 with the reset potential Vrst. As a result, the OLED element E1 is prevented from anomalously emitting light in a period intended not to emit light, achieving high contrast ratio.

Furthermore, the pixel circuit 200 is adjustable in the Vth compensation period, irrespective of the data write period. Appropriate Vth compensation and resulting reduction of image retention are achieved by determining an appropriate length of Vth compensation period. This feature produces great effect, especially in high frame-rate driving.

The pixel circuit 200 includes two capacitive elements C1 and C2 connected in series between the gate and the source of the driving transistor P1. These series capacitive elements C1 and C2 store the control voltage for controlling the amount of driving current to be supplied from the driving transistor P1. As described above, the gate potential of the driving transistor P1 after a data write does not depend on the capacitances of the capacitive elements C1 and C2. Accordingly, the driving current to the OLED element is not affected by the manufacturing variations of the capacitive elements C1 and C2.

Figure 6:
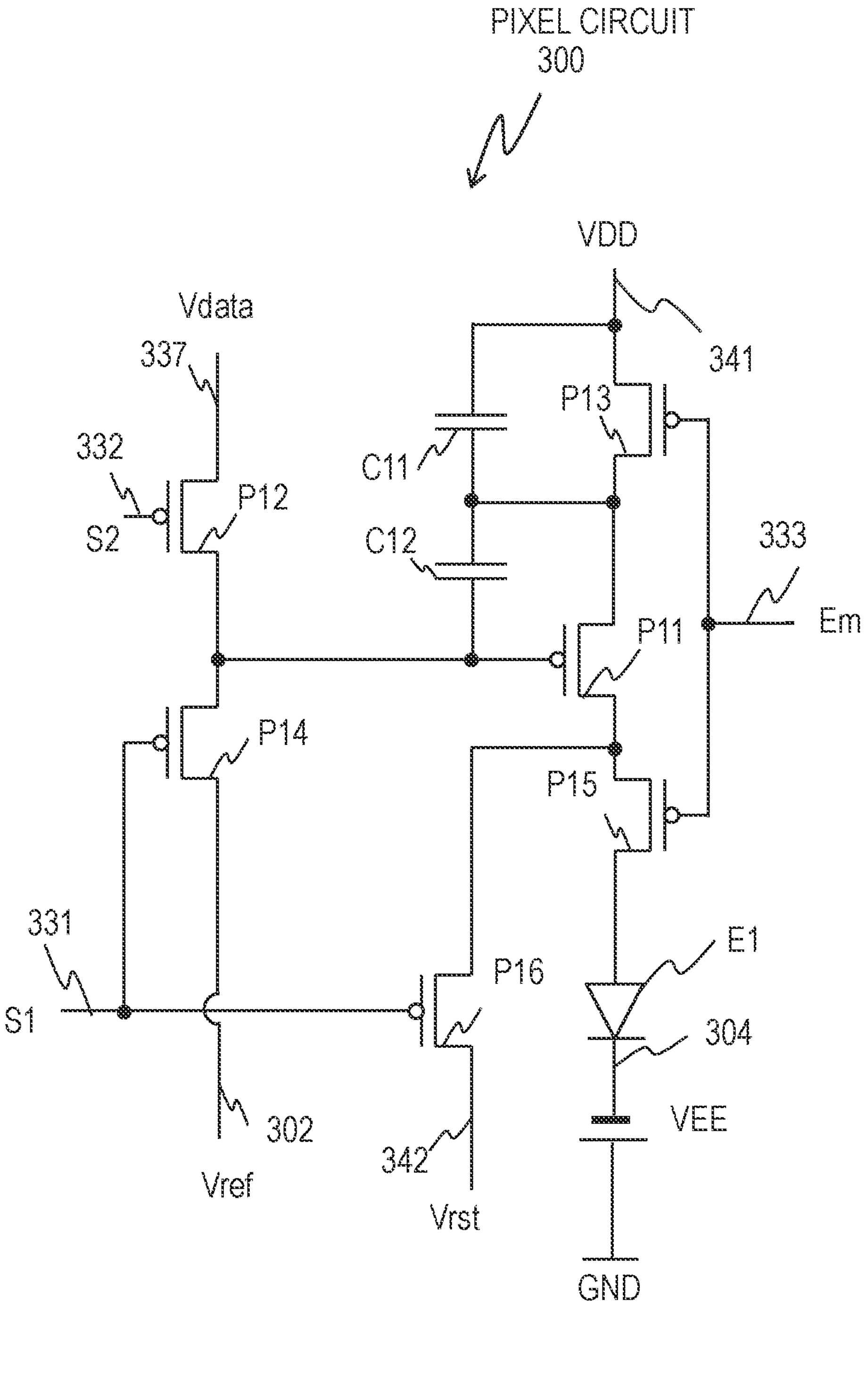
FIG. 6 illustrates a pixel circuit in another configuration example of an embodiment of this specification.

Meanwhile, a pixel circuit including series capacitive elements exhibits a steep variation (slope) of the current Ioled in an OLED element with respect to the data signal Vdata (a large Ioled-Vdata characteristic). Accordingly, low power consumption is achieved by narrowing the range of the data signal Vdata. From the opposite point of view, high-brightness display is attained with a narrow range of data signal Vdata Other Pixel Circuits Hereinafter, other examples of a pixel circuit are described. FIG. 6 illustrates a pixel circuit 300 in another configuration example of an embodiment of this specification. The pixel circuit 300 includes six transistors P11 to P16 and two storage capacitive elements C11 and C12. The transistors P11 to P16 are p-type TFTs.

The transistor P12, the transistor P13, the transistor P14, the transistor P15, and the transistor P16 are a sixth switching transistor, a seventh switching transistor, an eighth switching transistor, a ninth switching transistor, and a tenth switching transistor, respectively. A pixel circuit corresponding to the pixel circuit illustrated in FIG. 6 can be configured with n-type TFTs. The storage capacitive elements C11 and C12 are a third capacitive element and a fourth capacitive element, respectively.

The transistor P11 is a driving transistor for controlling the amount of electric current to an OLED element E1. The driving transistor P11 controls the amount of electric current to be supplied from a power supply of a positive power supply potential VDD to the OLED element E1 in accordance with the voltage stored in the storage capacitive element C12. This is because the both ends of the storage capacitive element C11 are connected to the potential VDD. The storage capacitive element C12 retains a written voltage throughout one frame period.

In general, when the potential of the data line changes with a cycle of one horizontal period, the parasitic capacitor between the data line and the gate node of the driving transistor affects the gate node potential of the driving transistor to change the brightness (crosstalk). In the case where the data voltage is stored in a composite capacitor of the series capacitors C1 and C2, the capacitance is small to cause crosstalk easily. In contrast, a circuit configured to store the data voltage in a single capacitor like the capacitor C12 in FIG. 6 is characterized by that crosstalk occurs less frequently because the capacitance is large. The storage capacitive element C11 contributes to threshold voltage compensation. The cathode of the OLED element E1 is connected to a power line 304 for transmitting a negative power supply potential VEE from the cathode power supply.

In the configuration example of FIG. 6, the capacitive elements C11 and C12 are connected in series between the power line 341 for transmitting the positive power supply potential VDD and the gate of the driving transistor P11. An end of the storage capacitive element C11 is connected to the power line 341. An end of the storage capacitive element C12 is connected to the gate of the driving transistor P11. An intermediate node between the storage capacitive elements C11 and C12 is connected to the source of the driving transistor P11.

The voltage of the storage capacitive elements C11 and C12 is the voltage between the gate of the driving transistor P11 and the power line 341. The source of the driving transistor P11 is connected to the power line 341 via the switching transistor P13. When the transistor P13 is ON, the storage capacitive element C12 stores the gate-source voltage of the driving transistor P11.

The transistors P13 and P15 are switching transistors for controlling ON/OFF of light emission of the OLED element E1. The source of the transistor P13 is supplied with the positive power supply potential VDD and the drain of the transistor P13 is connected to the source of the driving transistor P11. The source of the transistor P15 is connected to the drain of the driving transistor P11. The gates of the transistors P13 and P15 are connected to an emission control line 333; the transistors P13 and P15 are identically controlled by the emission control signal Em input from the scanning circuit 132 to their gates.

The transistor P16 works to supply a reset potential Vrst to the anode of the OLED element E1. An end of the source/drain of the transistor P16 is connected to a power line 342 for transmitting the reset potential Vrst and the other end is connected to a node between the drain of the driving transistor P11 and the source of the switching transistor P15.

The gate of the transistor P16 is connected to a selection signal line 331 for transmitting a selection signal S1; the transistor P16 is controlled by the selection signal S1. When the transistor P16 is turned ON by the selection signal S1 input from the scanning circuit 131 to its gate, the transistor P16 supplies the reset potential Vrst transmitted by the power line 342 to the anode of the OLED element E1 during the period where the transistor P15 is ON.

The transistor P14 is a switching transistor for writing a voltage for applying threshold compensation to the driving transistor P11 to the storage capacitive element C12. The transistor P14 controls whether to supply a reference potential Vref to the storage capacitive element C12.

An end of the source/drain of the transistor P14 is connected to a power line 302 for transmitting a reference potential Vref and the other end is connected to an end of the storage capacitive element C12. The gate of the transistor P14 is connected to the selection signal line 331 for transmitting the selection signal S1; the transistor P14 is controlled by the selection signal S1 input from the scanning circuit 131 to its gate.

When the transistor P14 is ON, the driving transistor P11 works as a source follower circuit, so that its threshold voltage is written to the capacitive element C12 located between the gate and the source of the driving transistor P11. The voltage of the storage capacitive element C11 is determined by the threshold voltage of the driving transistor P11 and the voltage between the positive power supply potential VDD and the reference potential Vref.

The transistor P12 is a switching transistor for selecting a pixel circuit to be supplied with a data signal Vdata and writing the data signal (data signal voltage) Vdata to the gate of the driving transistor P11. An end of the source/drain of the transistor P12 is connected to a data line 337 for transmitting the data signal Vdata and the other end is connected to the storage capacitive element C12.

The gate of the transistor P12 is connected to a selection signal line 332 for transmitting a selection signal S2. The transistor P12 is controlled by the selection signal S2 supplied from the scanning circuit 131. When the transistor P12 is ON, the transistor P12 supplies the data signal Vdata supplied from the driver IC 134 through the data line 337 to the gate of the driving transistor P11.

The storage capacitive elements C11 and C12 are connected in series between the power line 341 for transmitting the positive power supply potential VDD and the gate of the driving transistor P11. The potential at a node between the storage capacitive elements C11 and C12 is supplied to the source of the driving transistor P11. The potential at the node between the storage capacitive elements C11 and C12 is based on the data signal Vdata, the reference potential Vref, the threshold voltage Vth of the driving transistor P11, and the capacitances of the storage capacitive elements C11 and C12. Specifically, it is expressed as (Vdata*C1/(C1+C2)−Vth+Vref*C1/(C1+C2)).

Later, when the emission control signal Em becomes Low, the potential at this node becomes VDD but the voltage stored in the storage capacitive element C12 is maintained. Accordingly, the potential at the gate node of the driving transistor P11 becomes ((Vdata−Vref)*C1/(C1+C2)+VDD+Vth). In other words, the gate-source voltage of the driving transistor P11 is kept at ((Vdata−Vref)*C1/(C1+C2)+Vth) during an emission period.

Figure 7A:
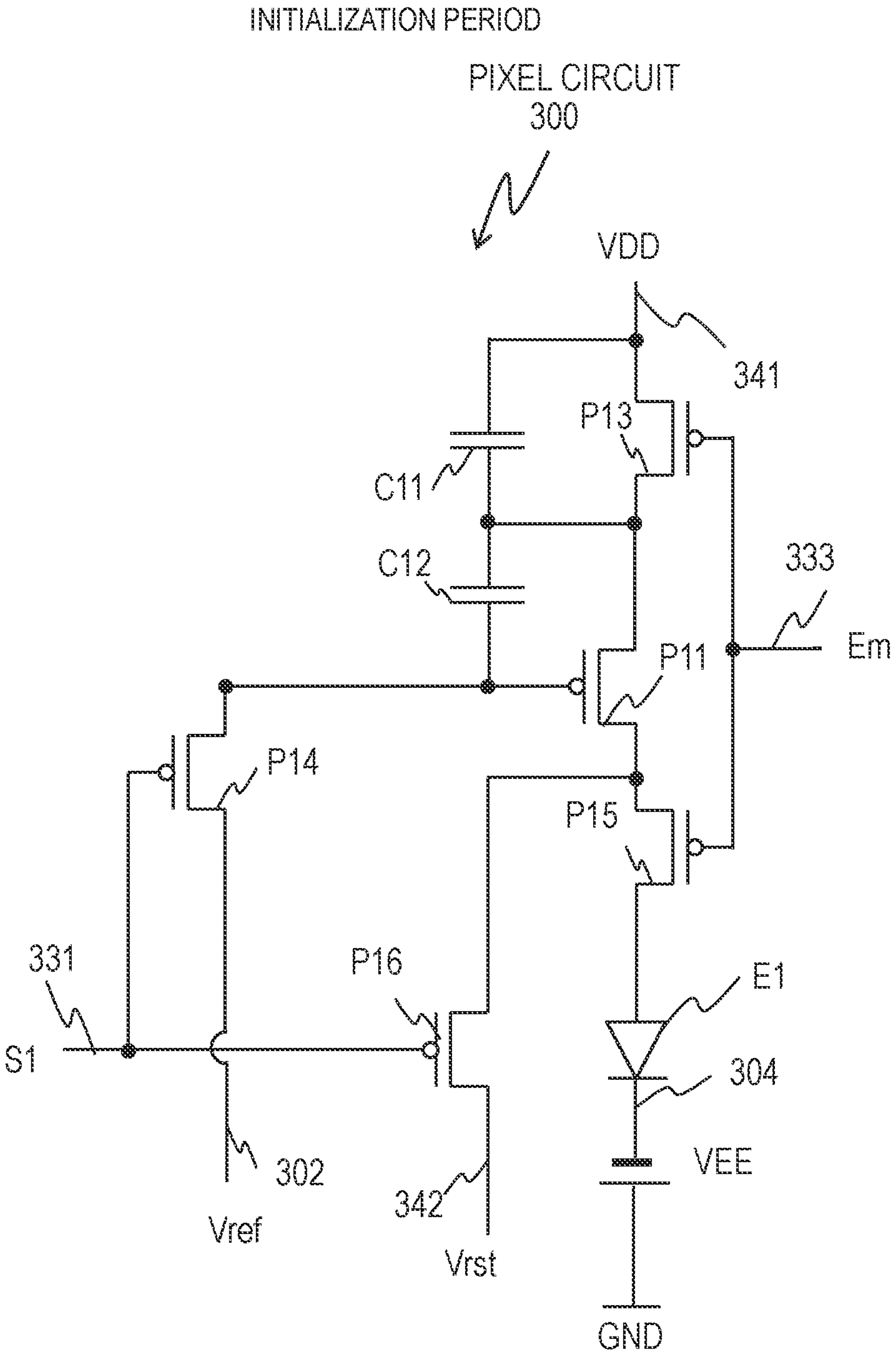
FIG. 7A illustrates transistors being ON in the pixel circuit illustrated in FIG. 6 in an initialization period.

The timing chart of the signals for controlling the pixel circuit 300 in FIG. 6 for one frame period is the same as the timing chart of FIG. 3. FIG. 7A illustrates transistors being ON during an initialization period. In the initialization period, the transistors P16 and P15 are ON. Accordingly, the reset potential Vrst is supplied to the anode of the OLED element E1. As a result, the OLED element E1 is prevented from anomalously emitting light in a period intended not to emit light. The transistor P14 turns ON and resets the gate of the driving transistor P11 with the potential Vref.

Figure 7B:
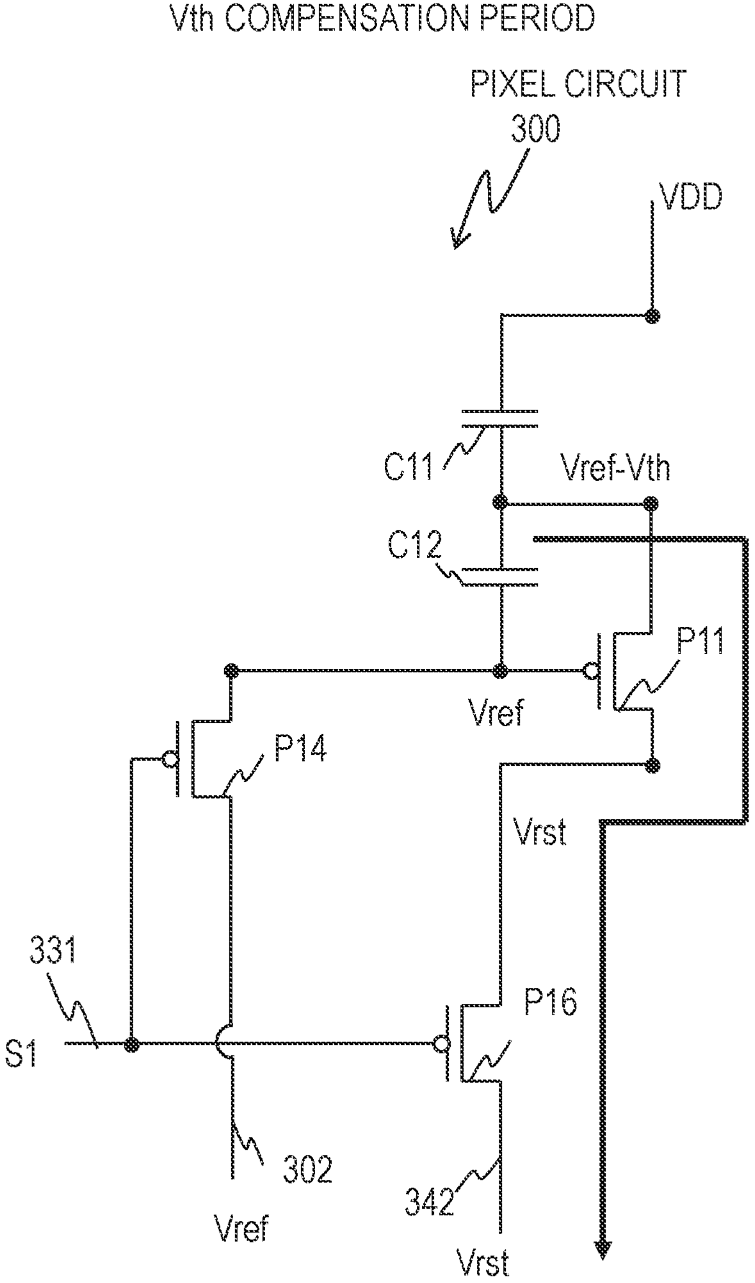
FIG. 7B illustrates transistors being ON, potentials at some nodes, and a flow of electric current in the pixel circuit illustrated in FIG. 6 in a Vth compensation period.

FIG. 7B illustrates transistors being ON, potentials at some nodes, and a flow of electric current in the pixel circuit 300 in a Vth compensation period. The transistors P14 and P16 are ON and the other transistors are OFF.

Since the transistor P14 is ON, the reference potential Vref is supplied to the gate of the driving transistor P11. Since the transistor P16 is ON, the reset potential Vrst is supplied to the drain of the driving transistor P11. The potential at the source of the driving transistor P11 or a node between the storage capacitive elements C11 and C12 becomes Vref−Vth. The storage capacitive element C12 stores the threshold voltage Vth of the driving transistor P11. After the Vth compensation period, the data signal Vdata is supplied to the gate of the driving transistor P11 and the storage capacitive element C12.

As described above, this pixel circuit 300 resets the anode potential of the OLED element E1 with the reset potential Vrst. As a result, the OLED element E1 is prevented from anomalously emitting light in a period intended not to emit light, achieving high contrast ratio.

Furthermore, the pixel circuit 300 is adjustable in the Vth compensation period, irrespective of the data write period. Appropriate Vth compensation and resulting reduction of image retention are achieved by determining an appropriate length of Vth compensation period. Especially in high frame-rate driving, its short horizontal period 1H makes the problem more significant; this feature produces great effect.

This pixel circuit 300 supplies the reset potential Vrst or a low potential to the drain of the driving transistor P11 during a Vth compensation period. Accordingly, the drain-source voltage of the driving transistor P11 is sufficiently large all the time. Even if the driving transistor P11 has a normally-on characteristic and the gate-source voltage gets positive, electric current flows through the driving transistor P11 to apply Vth compensation because the potential at the drain is fixed at Vrst.

Figure 8:
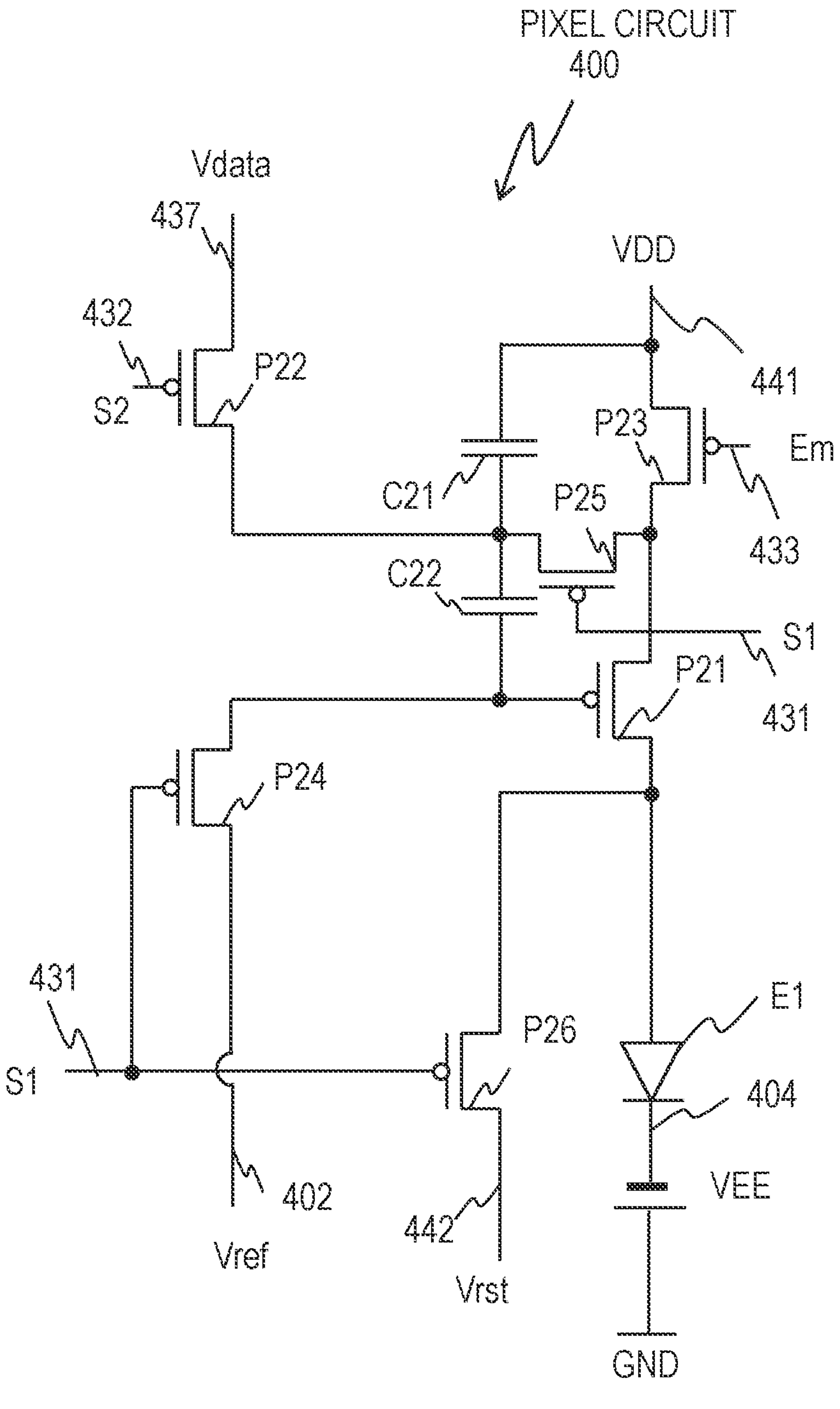
FIG. 8 illustrates a pixel circuit in still another configuration example of an embodiment of this specification.

Next, still another example of a pixel circuit is described. FIG. 8 illustrates a pixel circuit 400 in still another configuration example of an embodiment of this specification. The pixel circuit 400 includes six transistors P21 to P26 and two storage capacitive elements C21 and C22. The transistors P21 to P26 are p-type TFTs.

The transistor P22, the transistor P23, the transistor P24, the transistor P25, and the transistor P26 are an eleventh switching transistor, a twelfth switching transistor, a thirteenth switching transistor, a fourteenth switching transistor, and a fifteenth switching transistor, respectively. A pixel circuit corresponding to the pixel circuit illustrated in FIG. 8 can be configured with n-type TFTs. The storage capacitive elements C21 and C22 are a fifth capacitive element and a sixth capacitive element, respectively.

The transistor P21 is a driving transistor for controlling the amount of electric current to an OLED element E1. The driving transistor P21 controls the amount of electric current to be supplied from a power supply of a positive power supply potential VDD to the OLED element E1 in accordance with the voltage stored in the storage capacitive elements C21 and C22. The storage capacitive elements C21 and C22 retain a written voltage throughout one frame period. The cathode of the OLED element E1 is connected to a power line 404 for transmitting a negative power supply potential VEE from the cathode power supply.

In the configuration example of FIG. 8, the storage capacitive elements C21 and C22 are connected in series between a power line 441 for transmitting the positive power supply potential VDD and the gate of the driving transistor P21. An end of the storage capacitive element C21 is connected to the power line 441. An end of the storage capacitive element C22 is connected to the gate of the driving transistor P21. An intermediate node between the storage capacitive elements C21 and C22 is connected to the source/drain of the transistor P25.

The voltage of the storage capacitive elements C21 and C22 is the voltage between the gate of the driving transistor P21 and the power line 441. The source of the driving transistor P21 is connected to the power line 441 via the switching transistor P23. When the transistor P23 is ON, the storage capacitive elements C21 and C22 store the gate-source voltage of the driving transistor P21.

The transistor P23 is a switching transistor for controlling ON/OFF of light emission of the OLED element E1. The source of the transistor P23 is supplied with the positive power supply potential VDD and the drain of the transistor P23 is connected to the source of the driving transistor P21. The gate of the transistor P23 is connected to an emission control line 433 and the transistor P23 is controlled by the emission control signal Em input from the scanning circuit 132 to its gate.

The transistor P26 works to supply a reset potential Vrst to the anode of the OLED element E1. An end of the source/drain of the transistor P26 is connected to a power line 442 for transmitting the reset potential Vrst and the other end is connected to the anode of the OLED element E1.

The gate of the transistor P26 is connected to a selection signal line 431 for transmitting the selection signal S1; the transistor P26 is controlled by the selection signal S1. When the transistor P26 is turned ON by the selection signal S1 input from the scanning circuit 131 to its gate, the transistor P26 supplies the reset potential Vrst transmitted by the power line 442 to the anode of the OLED element E1.

The transistors P24, P25, and P26 are switching transistors for writing a voltage for applying threshold compensation to the driving transistor P21 to the storage capacitive element C22. The transistor P24 controls whether to supply a reference potential Vref to the storage capacitive element C22. The transistor P26 controls whether to supply the reset potential Vrst to the drain of the driving transistor P21. The transistor P25 switches ON/OFF the connection between the source of the driving transistor P21 and the intermediate node between the storage capacitive elements C21 and C22.

An end of the source/drain of the transistor P24 is connected to a power line 402 for transmitting the reference potential Vref and the other end is connected to an end of the storage capacitive element C22. The gate of the transistor P24 is connected to the selection signal line 431 for transmitting the selection signal S1; the transistor P24 is controlled by the selection signal S1 input from the scanning circuit 131 to its gate.

An end of the source/drain of the transistor P25 is connected to a source of the driving transistor P21 and the other end is connected to the intermediate node between the storage capacitive elements C21 and C22. The gate of the transistor P25 is connected to the selection signal line 431 for transmitting the selection signal S1; the transistor P25 is controlled by the selection signal S1 input from the scanning circuit 131 to its gate.

When the transistors P24 and P25 are ON, the driving transistor P21 works as a source follower circuit, so that its threshold voltage is written to the capacitive element C22 located between the gate and the source of the driving transistor P21. The voltage of the storage capacitive element C21 is determined by the threshold voltage stored in the storage capacitive element C22 and the voltage between the positive power supply potential VDD and the reference potential Vref. In this state, the potential at the gate of the driving transistor P21 is Vref and the potential at the intermediate node between the storage capacitive elements C21 and C22 is (Vref−Vth).

The transistor P22 is a switching transistor for selecting a pixel circuit to be supplied with a data signal Vdata and writing the data signal Vdata to the storage capacitive elements C21 and C22. One end of the source/drain of the transistor P22 is connected to a data line 437 for transmitting the data signal Vdata and the other end is connected to the intermediate node between the storage capacitive elements C21 and C22.

The gate of the transistor P22 is connected to a selection signal line 432 for transmitting a selection signal S2. The transistor P22 is controlled by the selection signal S2 supplied from the scanning circuit 131. When the transistor P22 is ON, the transistor P22 supplies the data signal Vdata supplied from the driver IC 134 through the data line 437 to the storage capacitive elements C21 and C22; the potential at the intermediate node between the storage capacitive elements C21 and C22 becomes Vdata and the potential at the gate of the driving transistor P21 becomes (Vdata+Vth).

Upon start of an emission period, the transistor P23 turns ON and supplies the positive power supply potential VDD to the source of the driving transistor P21. However, the potential at the gate of the driving transistor P21 is maintained at (Vdata+Vth) because the potential at the gate of the driving transistor P21 is held by the composite capacitor of the series storage capacitive elements C21 and C22.

The timing chart of the signals for controlling the pixel circuit 400 in FIG. 8 for one frame period is the same as the timing chart of FIG. 3. In the emission period, the transistor P25 is OFF and the transistor P23 is ON. The voltage stored in the storage capacitive elements C21 and C22 is supplied across the gate and the source of the driving transistor P21, so that the driving transistor P21 supplies driving current in accordance with the voltage to the OLED element E1.

As described above, this pixel circuit 400 resets the anode potential of the OLED element E1 with the reset potential Vrst. As a result, the OLED element E1 is prevented from anomalously emitting light in a period intended not to emit light, achieving high contrast ratio.

Furthermore, the pixel circuit 400 is adjustable in the Vth compensation period, irrespective of the data write period. Appropriate Vth compensation and resulting reduction of image retention are achieved by determining an appropriate length of Vth compensation period. This feature produces great effect, especially in high frame-rate driving.

The gate potential of the driving transistor P21 after a data write does not depend on the capacitances of the capacitive elements C21 and C22. Accordingly, the driving current to the OLED element is not affected by the manufacturing variations of the capacitive elements C21 and C22.

The pixel circuit 400 exhibits a steep variation (slope) of the current Ioled in an OLED element with respect to the data signal Vdata (a large Ioled-Vdata characteristic). Accordingly, low power consumption is achieved by narrowing the range of the data signal Vdata because the variation in potential of the data line when the displayed image is changed like a motion picture is small to achieve less electric charge to be stored to and released from the capacitors connected to the data line. This is because the gate-source voltage of the driving transistor P21 is (Vdata+Vth−Vdata) and it is not affected by the capacitances of the storage capacitive elements C21 and C22. From the opposite point of view, high-brightness display is attained by a narrow range of data signal Vdata.

The pixel circuit 400 supplies the reset potential Vrst or a low potential to the drain of the driving transistor P21 during a Vth compensation period. Accordingly, the drain-source voltage of the driving transistor P21 is sufficiently large all the time. Even if the driving transistor P21 has a normally-on characteristic, electric current flows through the driving transistor P21 to apply Vth compensation.

Figure 9:
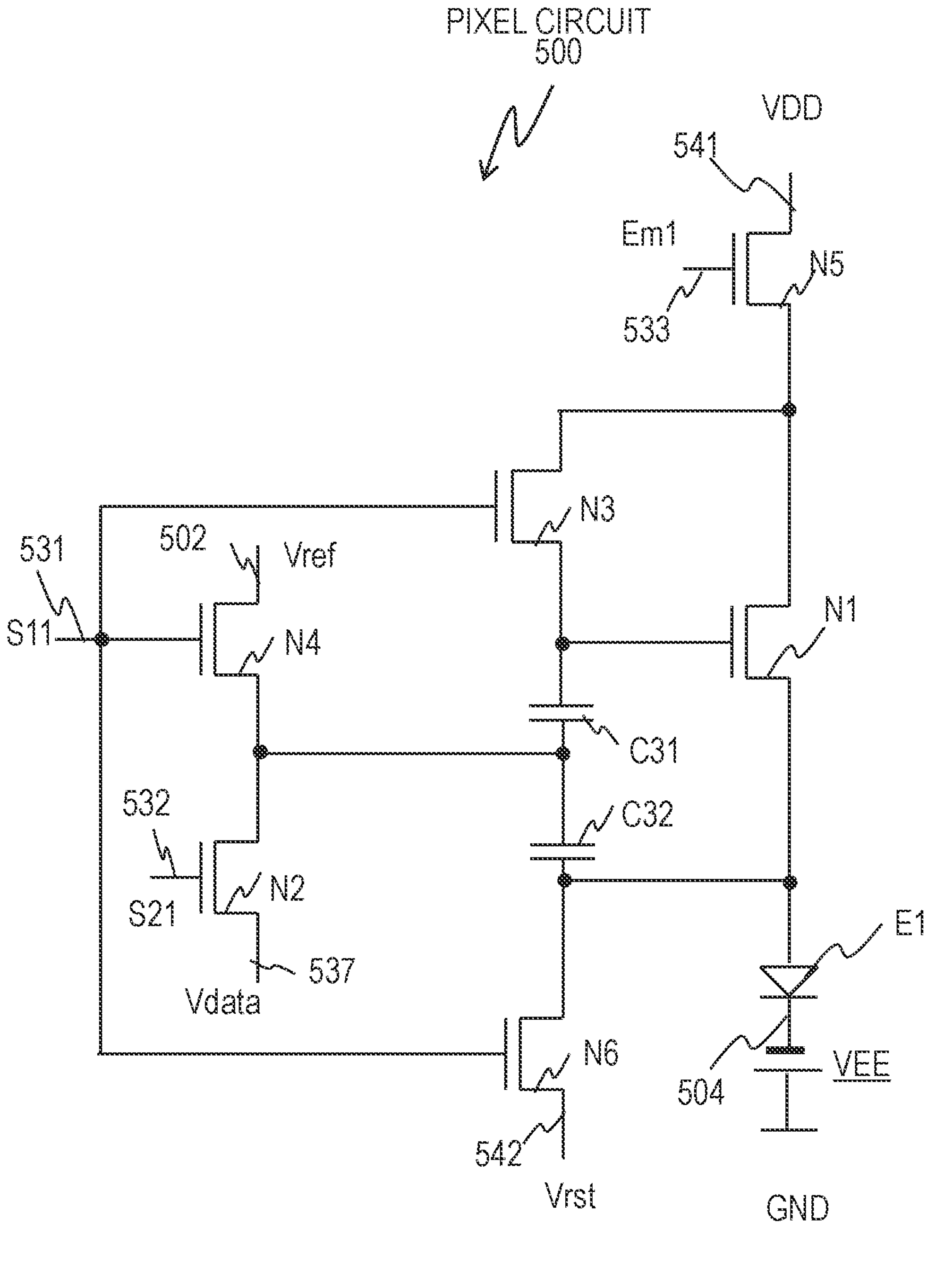
FIG. 9 illustrates a pixel circuit in still another configuration example of an embodiment of this specification.

Next, still another example of a pixel circuit is described. FIG. 9 illustrates a pixel circuit 500 in still another configuration example of an embodiment of this specification. In the following, differences from the pixel circuit illustrated in FIG. 2 are mainly described. The pixel circuit 500 includes six transistors N1 to N6 and two storage capacitive elements C31 and C32. The transistor N2, the transistor N3, the transistor N4, the transistor N5, and the transistor N6 are a first switching transistor, a second switching transistor, a third switching transistor, a fourth switching transistor, and a fifth switching transistor, respectively.

The transistors N1 to N6 are n-type TFTs. The n-type TFTs are, for example, oxide semiconductor TFTs. The pixel circuit 500 has a circuit configuration such that the p-type transistors in the pixel circuit 200 in FIG. 2 are replaced by n-type transistors. The storage capacitive elements C31 and C32 correspond to the storage capacitive elements C1 and C2, respectively. The storage capacitive elements C31 and C32 are a first capacitive element and a second capacitive element, respectively.

Figure 10:
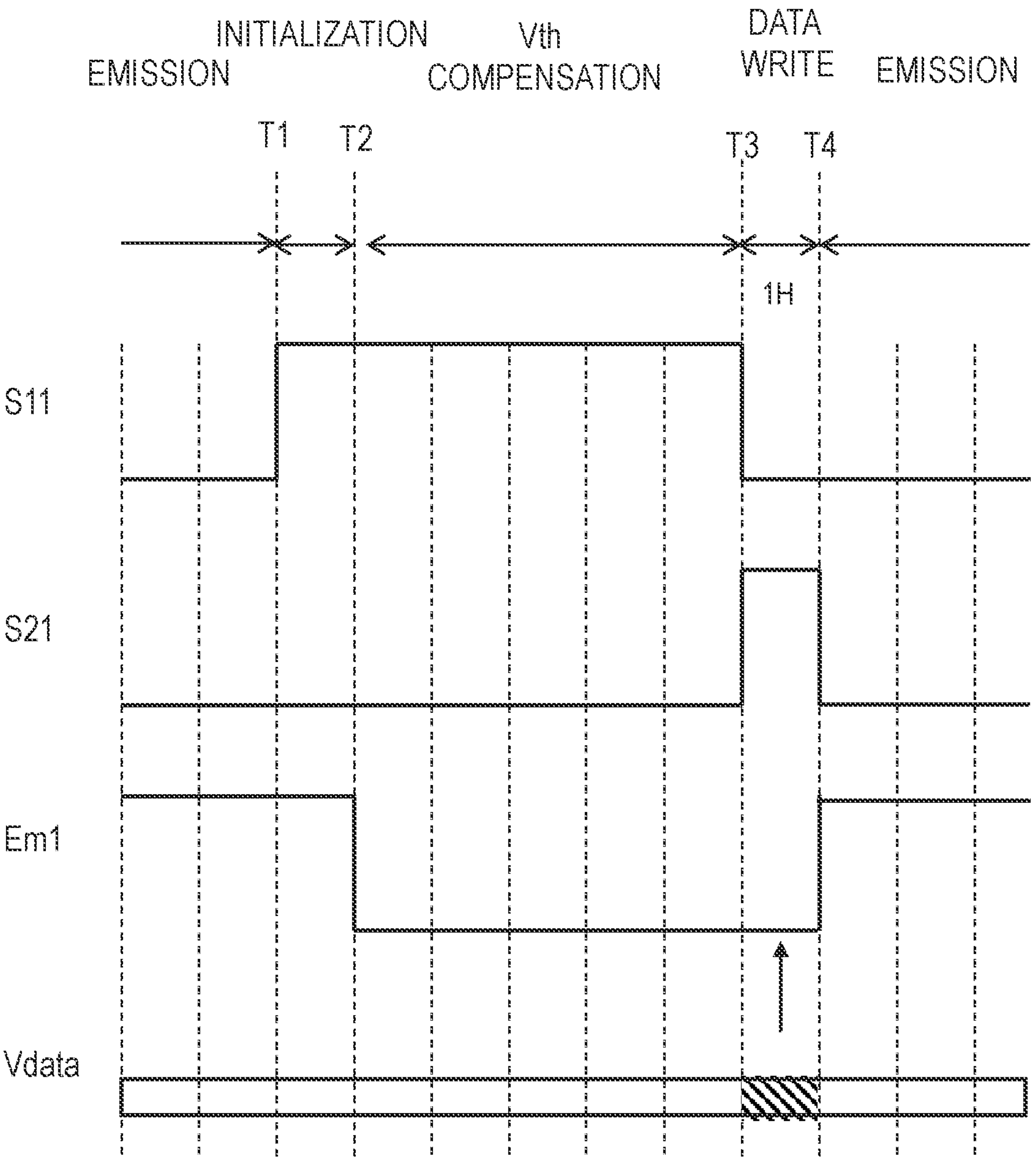
FIG. 10 is a timing chart of the signals for controlling the pixel circuit illustrated in FIG. 9 for one frame period.

FIG. 10 is a timing chart of the signals for controlling the pixel circuit 500 illustrated in FIG. 9 for one frame period. The control signals S11, S21 and Em1 show temporal variations opposite from those of the control signals S1, S2 and Em shown in FIG. 3. Hence, the transistors N1 to N6 operate in the same ways as the transistors P1 to P6 in the pixel circuit 200 in FIG. 2. The pixel circuit 500 produces the effects described above about the pixel circuit 200 in FIG. 2.

Power lines 502, 504, 541, and 542 transmit the reference potential Vref, the negative power supply potential VEE, the positive power supply potential VDD, and the reset potential Vrst, respectively. A signal line 537 transmits the data signal Vdata; control lines 531 and 532 transmit the selection signals S11 and S21, respectively; and a control line 533 transmits the emission control signal Em1.

Figure 11A:
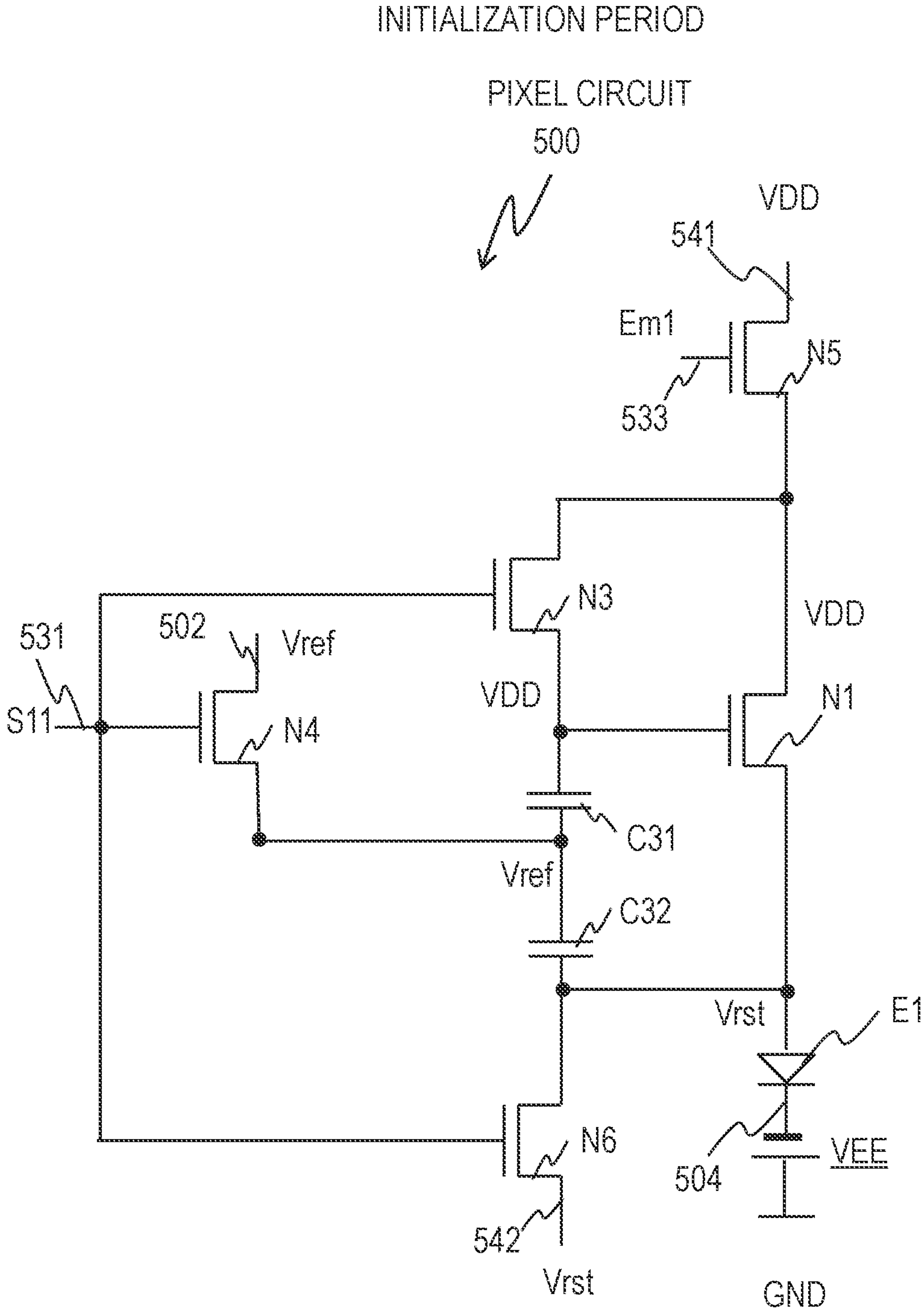
FIG. 11A illustrates transistors being ON and potentials at some nodes in the pixel circuit illustrated in FIG. 9 in an initialization period.
Figure 11B:
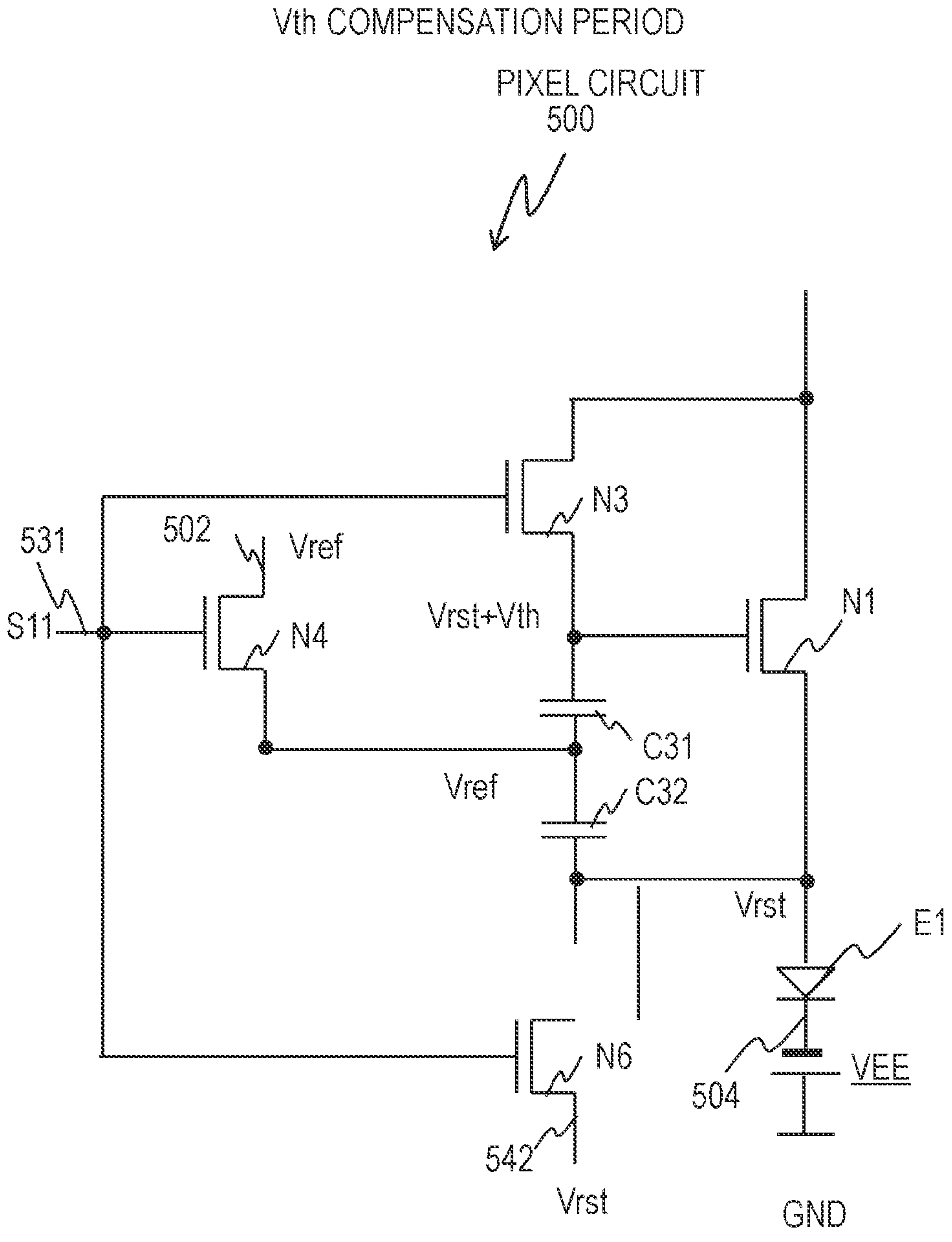
FIG. 11B illustrates transistors being ON and potentials at some nodes in the pixel circuit illustrated in FIG. 9 in a Vth compensation period.
Figure 11C:
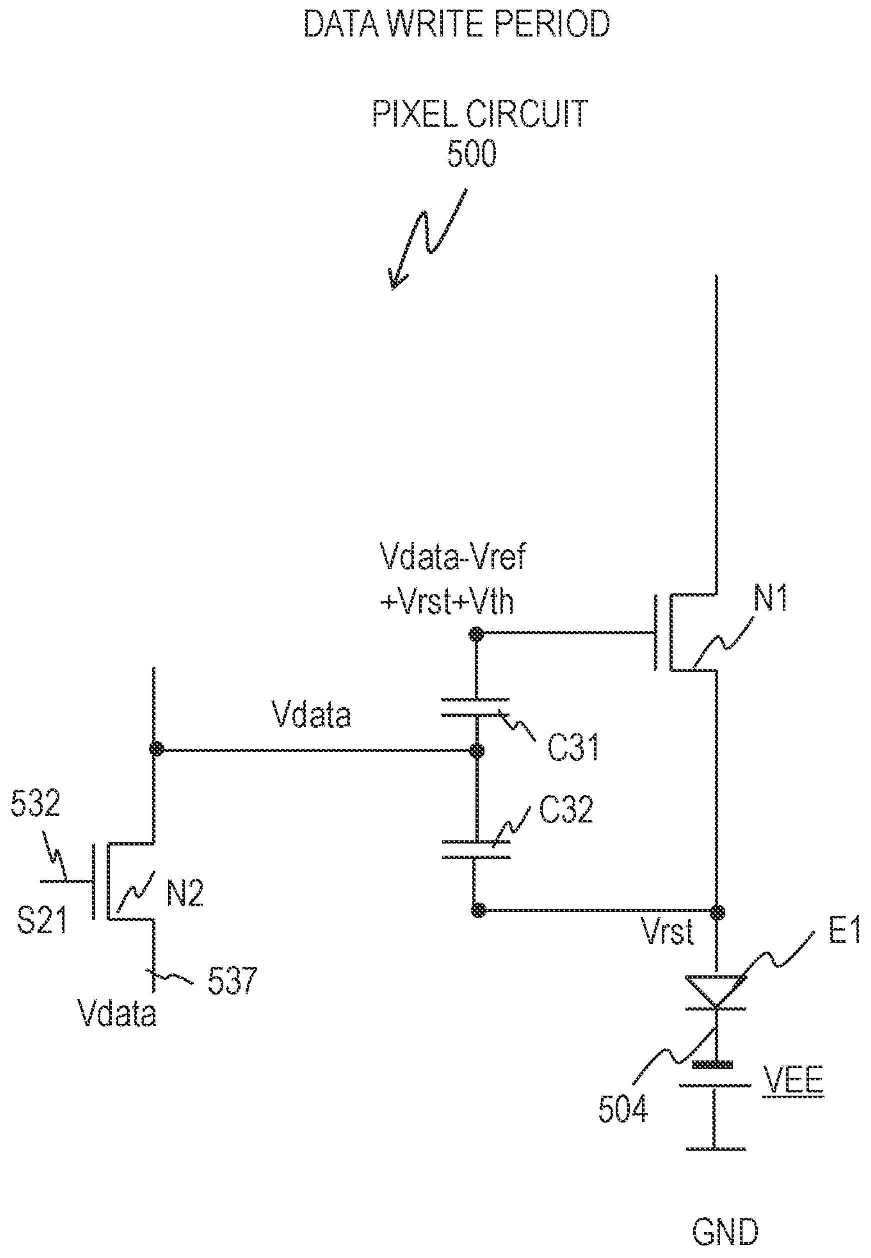
FIG. 11C illustrates transistors being ON and potentials at some nodes in the pixel circuit illustrated in FIG. 9 in a data write period.

FIGS. 11A, 11B, and 11C illustrate transistors being ON and the potentials at some nodes in the pixel circuit 500 in an initialization period, a Vth compensation period, and a data write period, respectively.

As illustrated in FIG. 11A, the transistors N3 to N6 are ON during an initialization period. The drain and the gate of the driving transistor N1 are at the positive power supply potential VDD. The intermediate node between the storage capacitive elements C31 and C32 is at the reference potential Vref and the anode of the OLED element E1 is at the reset potential Vrst.

As illustrated in FIG. 11B, the transistors N3, N4, and N6 are ON during a Vth compensation period. The gate of the driving transistor N1 is at a potential (Vrst+Vth). The intermediate node between the storage capacitive elements C31 and C32 is at the reference potential Vref and the anode of the OLED element E1 is at the reset potential Vrst.

As illustrated in FIG. 11C, the transistor N2 is ON during a data write period. The intermediate node between the storage capacitive elements C31 and C32 is at a data signal (potential) Vdata and the anode of the OLED element E1 is at the reset potential Vrst. The gate of the driving transistor N1 is at a potential (Vdata−Vref+Vrst+Vth). The gate potential of the driving transistor N1 is maintained at (Vdata−Vref+Vrst+Vth) for an emission period.

Figure 12A:
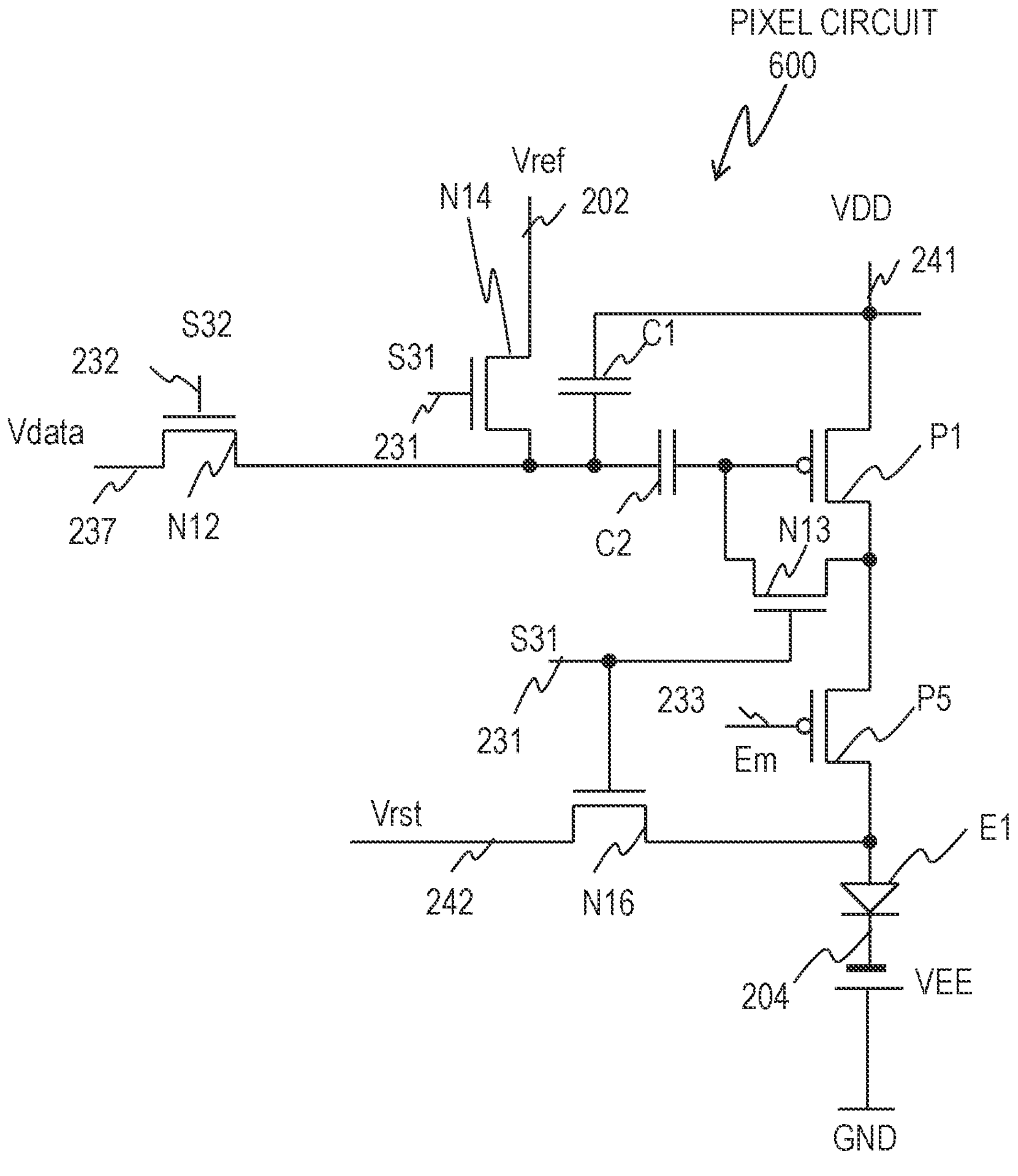
FIG. 12A illustrates still another configuration example of a pixel circuit and control signals therefor in an embodiment of this specification.

Next, still another example of a pixel circuit is described. FIG. 12A illustrates a configuration example of a pixel circuit 600 and control signals therefor in an embodiment of this specification. Differences from the pixel circuit 200 in FIG. 2 are mainly described. The pixel circuit 600 includes n-type transistors N12, N13, N14, and N16 in place of the p-type transistors P2, P3, P4, and P6 in the pixel circuit 200. The transistors N12, N13, N14, and N16 can be oxide semiconductor transistors. The p-type transistors P1 and P5 can be low-temperature polysilicon thin-film transistors. During an emission period, the gate voltage Vgs of the driving transistor P1 is at (Vdata−Vref+Vth).

The source/drain regions of the transistors N12, N13, and N14 are connected to a storage capacitor. Oxide semiconductor transistors generate small off-leakage current and therefore, the voltage (electric charge) stored in a storage capacitor can be maintained for a long time. Low-frequency driving has a long frame period, or a long emission period. Accordingly, variation in brightness is large until refreshing by writing a video signal or so, which causes a problem of flicker (blink of light or fluctuation in brightness). The configuration of this pixel circuit reduces the flicker in low-frequency driving.

The transistor N16 in the circuit configuration example illustrated in FIG. 12A is of the same conductive type as the transistors N13 and N14 and therefore, this pixel circuit can be controlled with a smaller number (three in FIG. 12A) of kinds of control signals, for example by controlling the three transistors N13, N14, and N16 with the single S1 signal.

Figure 12B:
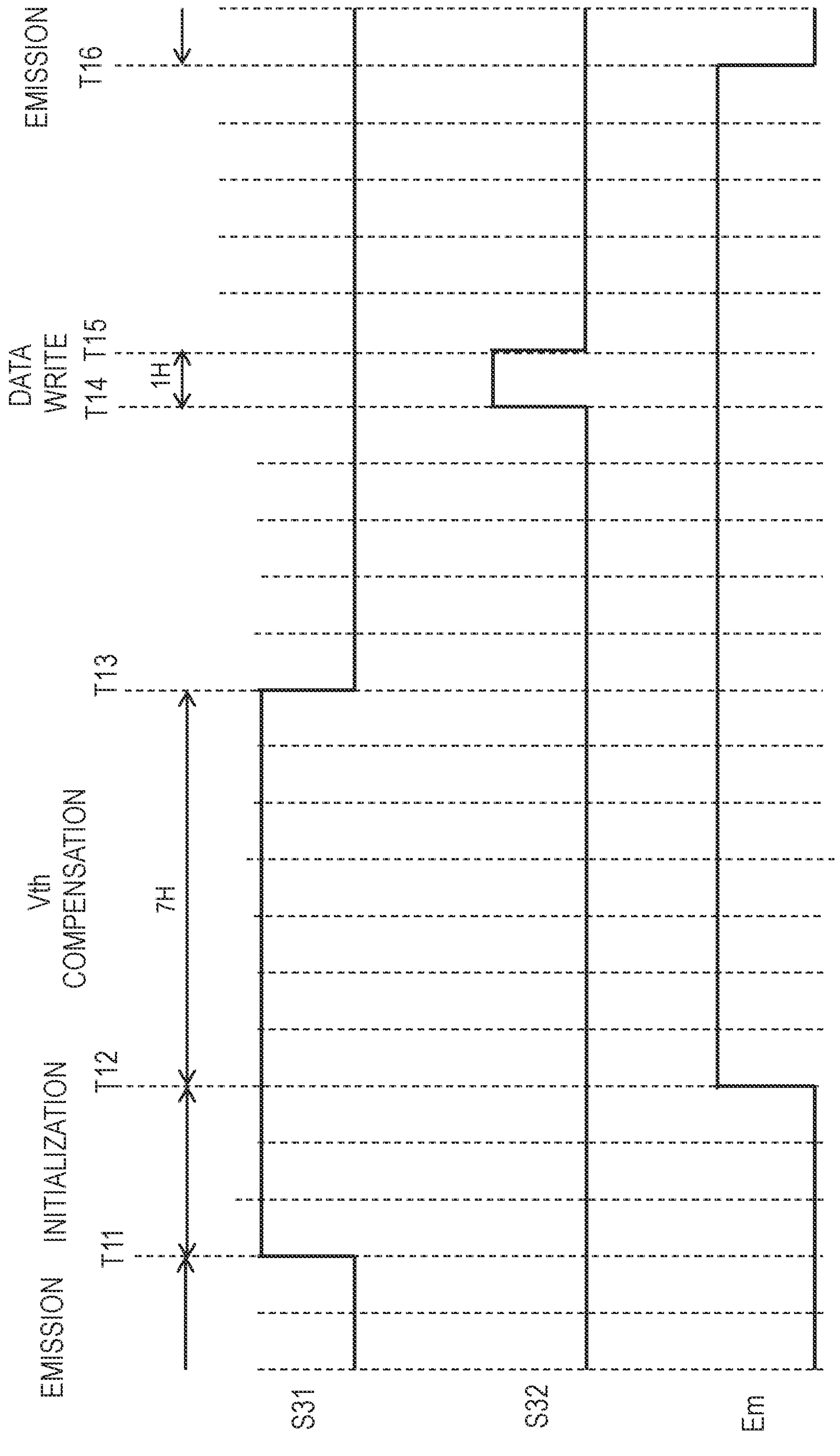
FIG. 12B is a timing chart of the signals for controlling the pixel circuit illustrated in FIG. 12A.

The control signals for the pixel circuit 600 include selection signals S31 and S32 and an emission control signal Em. FIG. 12B is a timing chart of the signals for controlling the pixel circuit 600 illustrated in FIG. 12A for one frame period. FIG. 12B is a timing chart for selecting the k-th row and writing a data signal to the pixel circuit 600. Specifically, the signals illustrated in FIG. 12B are the selection signal S31, the selection signal S32, and the emission control signal Em.

The period prior to a time T11 is an emission period. The selection signals S31 and S32, and the emission control signal Em are Low. During this period, the transistor P5 is ON and the remaining transistors are OFF. Accordingly, the voltage stored in the composite capacitor of the series storage capacitive elements C1 and C2 causes driving current to be supplied from the power line 241 to the OLED element E1 through the driving transistor P1 and the transistor P5, so that the OLED element E1 emits light.

The period from the time T11 to a time T12 is an initialization period. At the time T11, the selection signal S31 changes from Low to High. The selection signal S32 remains Low and the emission control signal Em remains Low. The transistors N13, N14, and N16 turn ON at the time T11. The transistor N12 remains OFF and the transistor P5 remains ON.

The emission control signal Em changes from Low to High at the time T12. The selection signal S31 remains High and the selection signal S32 remains Low. In response to the change of the emission control signal Em, the transistor P5 turns OFF. This state is maintained from the time T12 to a time T13. The period from the time T12 to the time T13 is a threshold voltage (Vth) compensation period for the driving transistor P1. In the example of FIG. 12B, the Vth compensation period has a length of 7H (7 horizontal periods). The length of 1H is 3 μs in the case where the frame frequency is 120 Hz.

The selection signal S31 changes from High to Low at the time T13. The emission control signal Em remains High. The transistors N13, N14, and N16 turn OFF in response to the change of the selection signal S31.

At a time T14 after several (five in the example of FIG. 12B) horizontal periods from the time T13, the selection signal S32 changes from Low to High. The selection signal S31 remains Low and the emission control signal Em remains High. The transistor N12 turns ON in response to the change of the selection signal S32. Since the emission control signal Em remains High, the transistor P5 remains OFF. The period from the time T14 to a time T15 is a data write period (1H) to write a data signal to the storage capacitive elements C1 and C2.

The selection signal S32 changes from High to Low at the time T15. The selection signal S31 remains Low and the emission control signal Em remains High. The transistor N12 turns OFF in response to the change of the selection signal S32.

At a time T16 after a several (five in the example of FIG. 12B) horizontal periods from the time T15, the emission control signal Em changes from High to Low. The selection signals S31 and S32 remain Low. The transistor P5 turns ON in response to the change of the emission control signal Em. The transistors N12, N13, N14, and N16 remain OFF.

The period later than the time T16 is an emission period. The driving transistor P1 supplies driving current to the OLED element E1 through the transistor P5 in accordance with the aforementioned voltage (Vdata−Vref+Vth). This state continues to the time T11 of the next frame.

Applying the relation of the pixel circuit 200 to the pixel circuit 600 to the pixel circuit 300 or 400, one or more of the p-type transistors in the pixel circuit 300 or 400 can be replaced with n-type transistors. For example, the transistors P12, P14, and P16 in the pixel circuit 300 or the transistors P22, P24, P25, and P26 in the pixel circuit 400 can be replaced with n-type transistors.

Figure 13A:
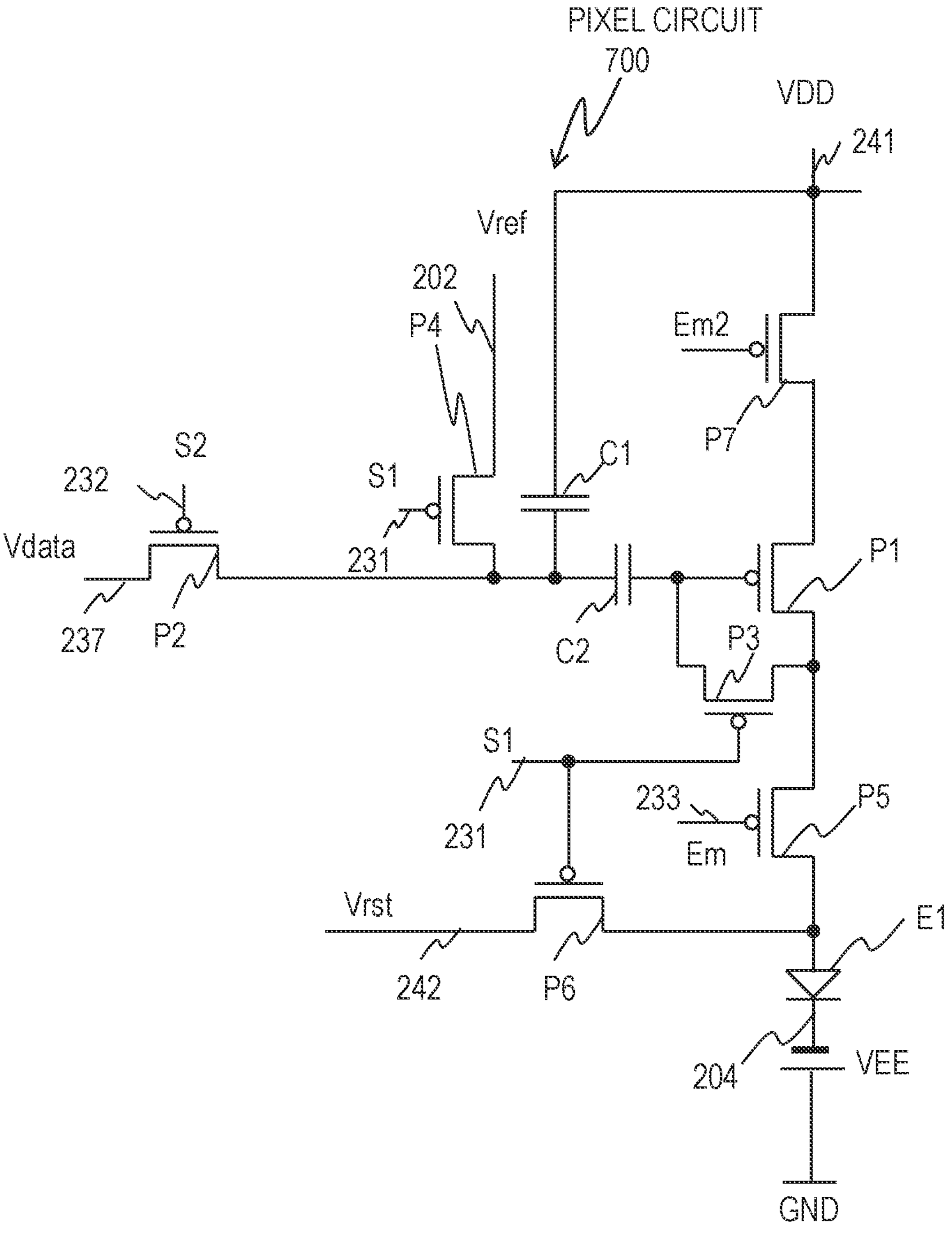
FIG. 13A illustrates still another configuration example of a pixel circuit and control signals therefor in an embodiment of this specification.

Next, still another example of a pixel circuit is described. FIG. 13A illustrates a configuration example of a pixel circuit 700 and control signals therefor in an embodiment of this specification. Differences from the pixel circuit 200 in FIG. 2 are mainly described. The pixel circuit 700 includes a p-type switching transistor P7, in addition to the configuration of the pixel circuit 200. The transistor P7 is a sixteenth switching transistor. The transistor P7 is connected between the driving transistor P1 and the power line 241; its source is connected to the power line 241 and its drain is connected to the source of the driving transistor P1.

Figure 13B:
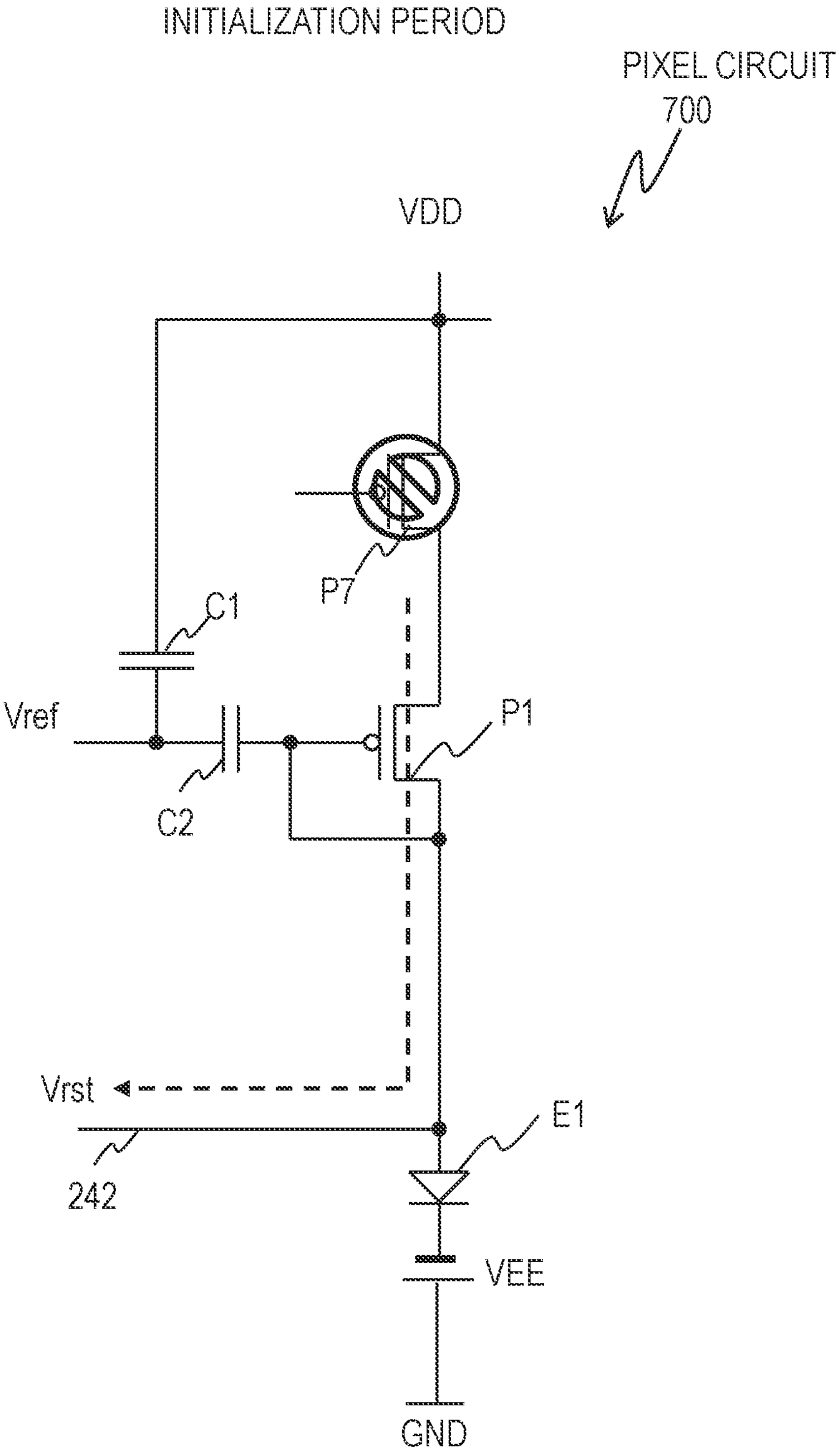
FIG. 13B is a diagram for illustrating an effect of the pixel circuit in FIG. 13A to prevent through current from flowing from a power supply to another.

The transistor P7 is OFF during an initialization period to disconnect the pixel circuit 700 from the power line 241. This prevents through current from flowing from the power supply VDD to the power supply Vrst. This effect is described more specifically with reference to FIG. 13B. In response to the transistor P7 turning OFF, the stored electric charge flows to the reset power line 242, so that the current flowing through the driving transistor P1 gradually decreases. The lowered anode potential of the OLED element E1 lowers the brightness of black and prevents through current, which reduces the power consumption.

Figure 14:
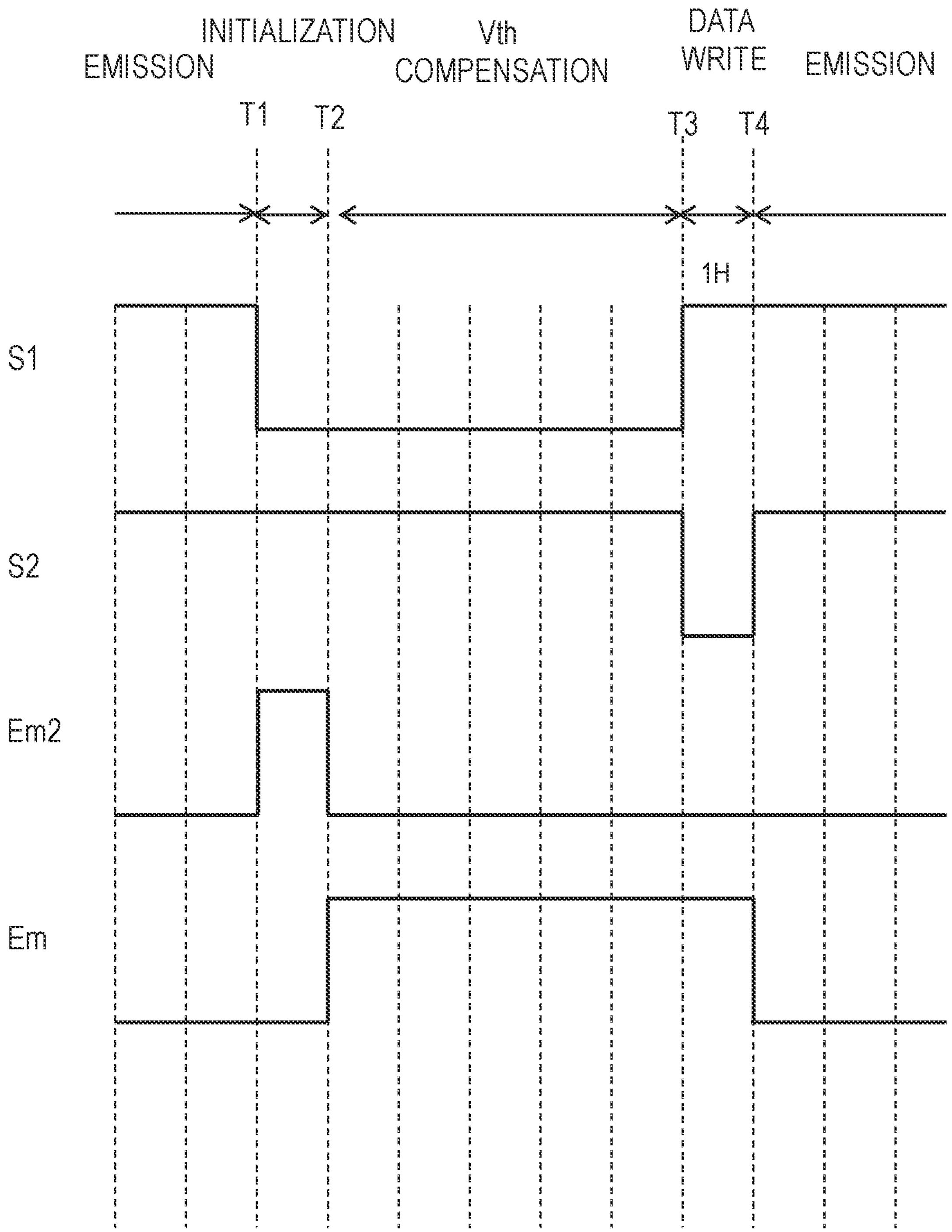
FIG. 14 is a timing chart of the signals for controlling the pixel circuit illustrated in FIG. 13A for one frame period.

FIG. 14 is a timing chart of the signals for controlling the pixel circuit 700 illustrated in FIG. 13A for one frame period. Differences from the timing chart of FIG. 3 are mainly described. In addition to the temporal variations of the selection signals S1 and S2 and the emission control signal Em, FIG. 14 includes temporal variation of a second emission control signal Em2 to be supplied to the gate of the transistor P7. The second emission control signal Em2 is High during an initialization period (from T1 to T2) and is Low during the remaining period. The transistor P7 is OFF during the initialization period and is ON during the remaining period.

Figure 15:
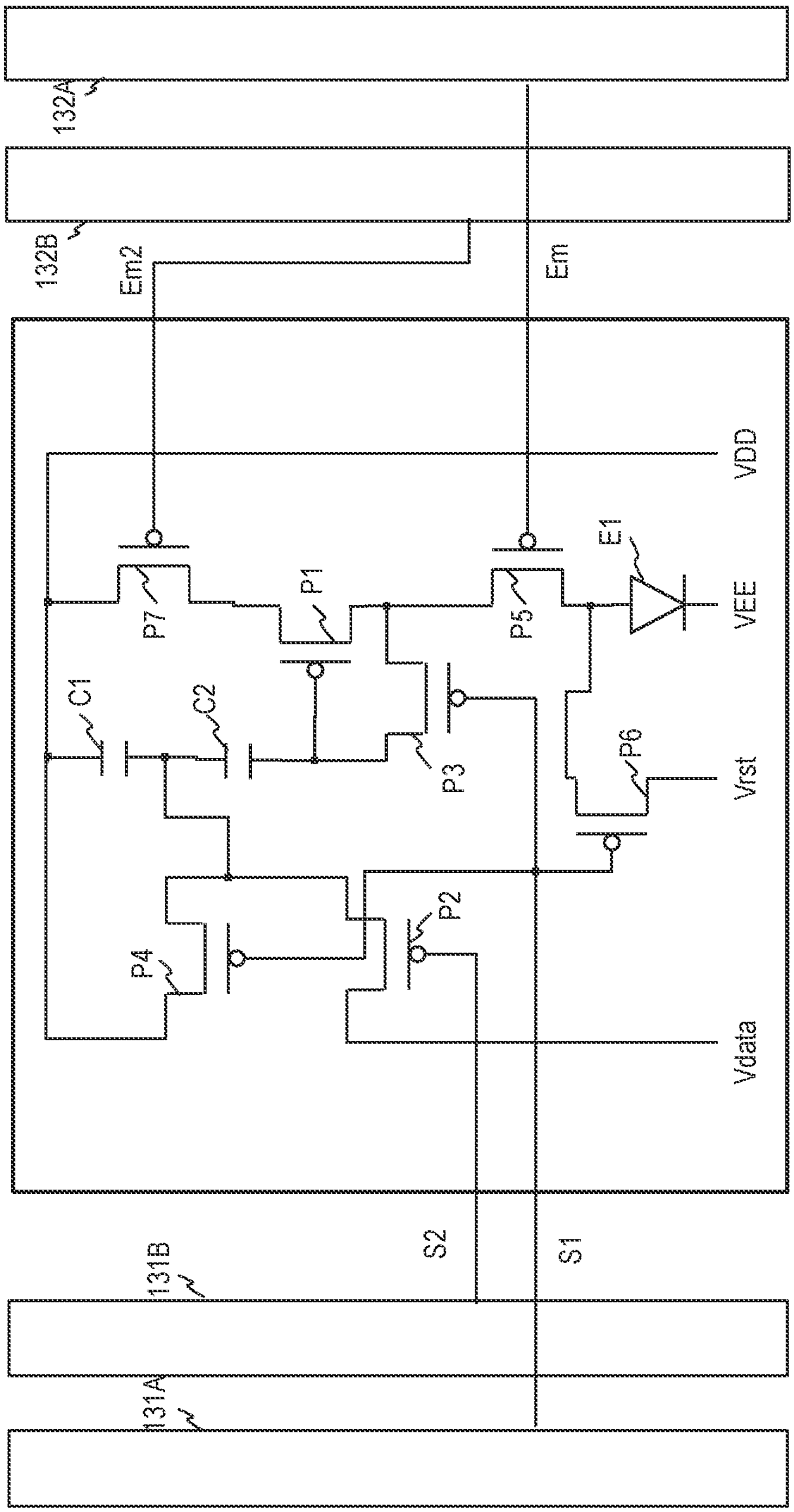
FIG. 15 schematically illustrates an example of the layout of circuits for supplying the control signals to the pixel circuit illustrated in FIG. 13A.

FIG. 15 schematically illustrates an example of the layout of circuits for supplying the control signals S1, S2, Em, and Em2 to the pixel circuit 700. Two scanning circuits 131A and 131B are disposed on the left of the display region and two scanning circuits 132A and 132B are disposed on the right of the display region. Each scanning circuit includes a shift register. The scanning circuits 131A and 131B output the selection signals S1 and S2, respectively. The scanning circuits 132A and 132B output the emission control signals Em and Em2, respectively.

Vth Compensation Period

Hereinafter, the Vth compensation period is described. The inventors' research revealed that image retention can be diminished to an ignorable level by determining a Vth compensation period within a specific range. First, examples of image retention are explained.

For example, when the image displayed on an OLED display device is changed from a fixed black and white checkerboard pattern to an image of a uniform intermediate emission level, a ghost image affected by the fixed pattern is displayed for a while. The intensity (difference in brightness) and the lifetime of the ghost depend on the display period of the fixed pattern (stress time); the ghost fades with time. Image retention produces two types of ghosts: a negative ghost having brightness and darkness opposite (having opposite polarities) from those of the fixed pattern and a positive ghost having brightness and darkness same (having the same polarities) as those of the fixed pattern.

Figure 16:
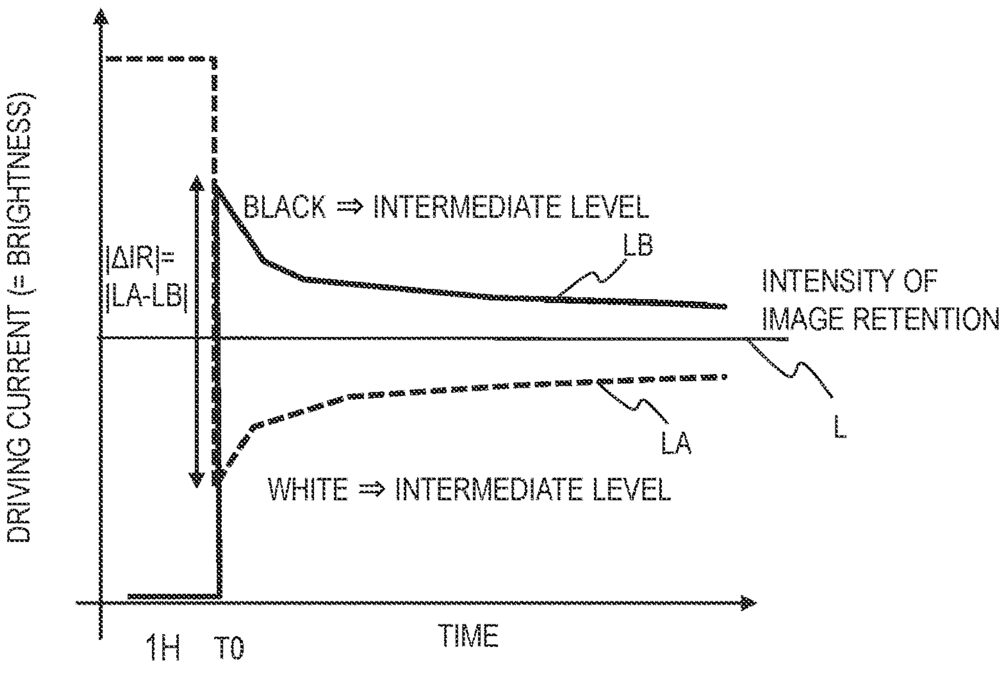
FIG. 16 illustrates variation of driving currents (transient currents) for two pixels in negative image retention.

FIG. 16 illustrates variation of the driving currents (transient currents) for two pixels in negative image retention. The driving current is an electric current to flow in an OLED element. When the driving current is higher, the brightness of the OLED element is higher. In FIG. 16, the horizontal axis represents time and the vertical axis represents driving current. The current LB represents the driving current for a pixel changing from black (the lowest level) to an intermediate level. The current LA represents the driving current for a pixel changing from white (the highest level) to the intermediate level.

At a time T0, the data signals for the pixels change from the values for the initial image to the value for the intended image. The driving current LB for a pixel that has displayed black increases to higher than (overshoots) the intended driving current L and then gradually decreases toward the intended driving current L. Conversely, the driving current LA for a pixel that has displayed white decreases to lower than (undershoots) the intended driving current L and then gradually increases toward the intended driving current L.

In positive image retention, the driving current LB for a pixel that has displayed black drastically increases to a value lower than the intended driving current L and then gradually increases toward the intended driving current L. Conversely, the driving current LA for a pixel that has displayed white drastically decreases to a value higher than the intended driving current L and then gradually decreases toward the intended driving current L.

A current difference between the transient currents is defined as $|\Delta IR|=|LA-LB|$. The current difference $|\Delta IR|$ is the absolute value of the difference between the current LA and the current LB at the time T0.

The inventors studied the relation between the image retention and the current difference between transient currents and found out that the image retention is not perceived of when the ratio of the difference between transient currents to the intended current L ($|\Delta IR|/L$) is small. Specifically, the inventors were able to ignore the effect of image retention when the ratio of the difference between transient currents to the intended current L$|\Delta IR|/L$ is not higher than 1% (0.01).

Figure 17:
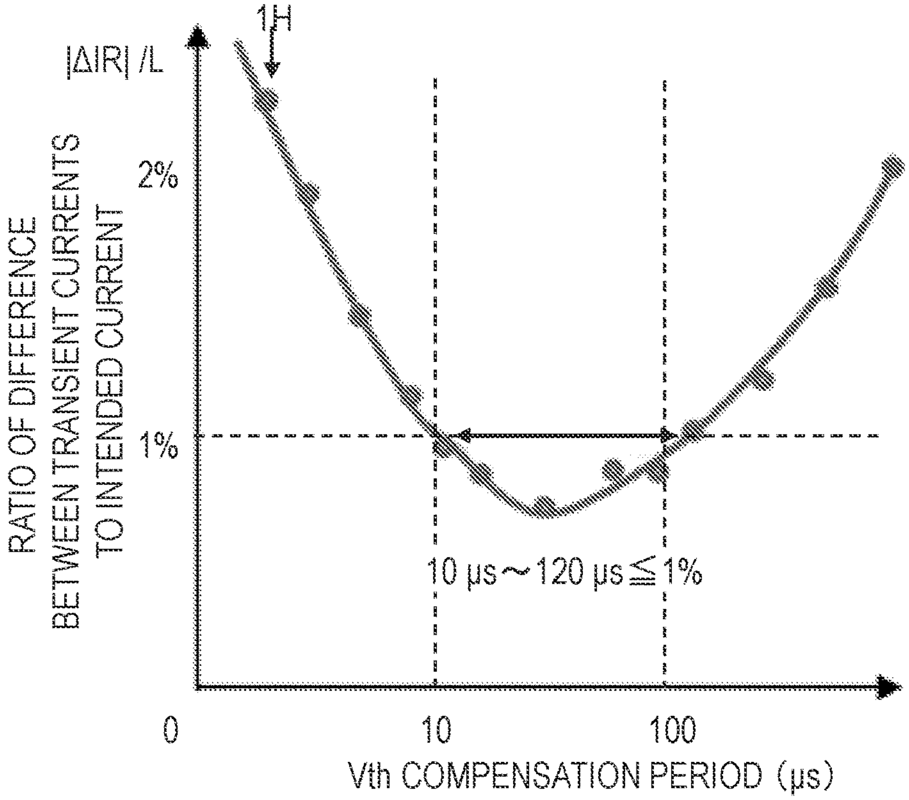
FIG. 17 is a graph of measured values indicating the relation between the Vth compensation period and the ratio of the difference between transient currents and to the intended current $|\Delta IR|/L$.

FIG. 17 is a graph of measured values indicating the relation between the Vth compensation period and the ratio of the difference between transient currents to the intended current L$|\Delta IR|/L$. The horizontal axis represents the length of the Vth compensation period and the vertical axis represents the ratio of the difference between transient currents to the intended current L$|\Delta IR|/L$. The measurement revealed that the ratio of the difference between transient currents to the intended current L$|\Delta IR|/L$ can be maintained not to exceed 1% when the Vth compensation period is in a range from 10 microseconds (μs) to 120 μs. Accordingly, the image retention can be effectively reduced by determining the Vth compensation period within the range from 10 μs to 120 μs.

Control Signals

Hereinafter, control signals for a pixel circuit are described. An embodiment of this specification specifies the phase difference θ between the selection signal (scanning signal) S2 and the data signal Vdata. The selection signal S2 is a control signal for turning ON/OFF the transistors P2, P12, P22, or the like for controlling writing the data signal to the pixel circuit.

In an embodiment of this specification, the phase difference θ between the two signals are specified as follows:

$$-\pi/3\leq\theta\leq 0 \text{ (when } f=120\text{ Hz, } -2\ \mu s\leq t\leq 0),$$

where f represents the frame frequency and t represents the time lag between two signals.

Figure 18:
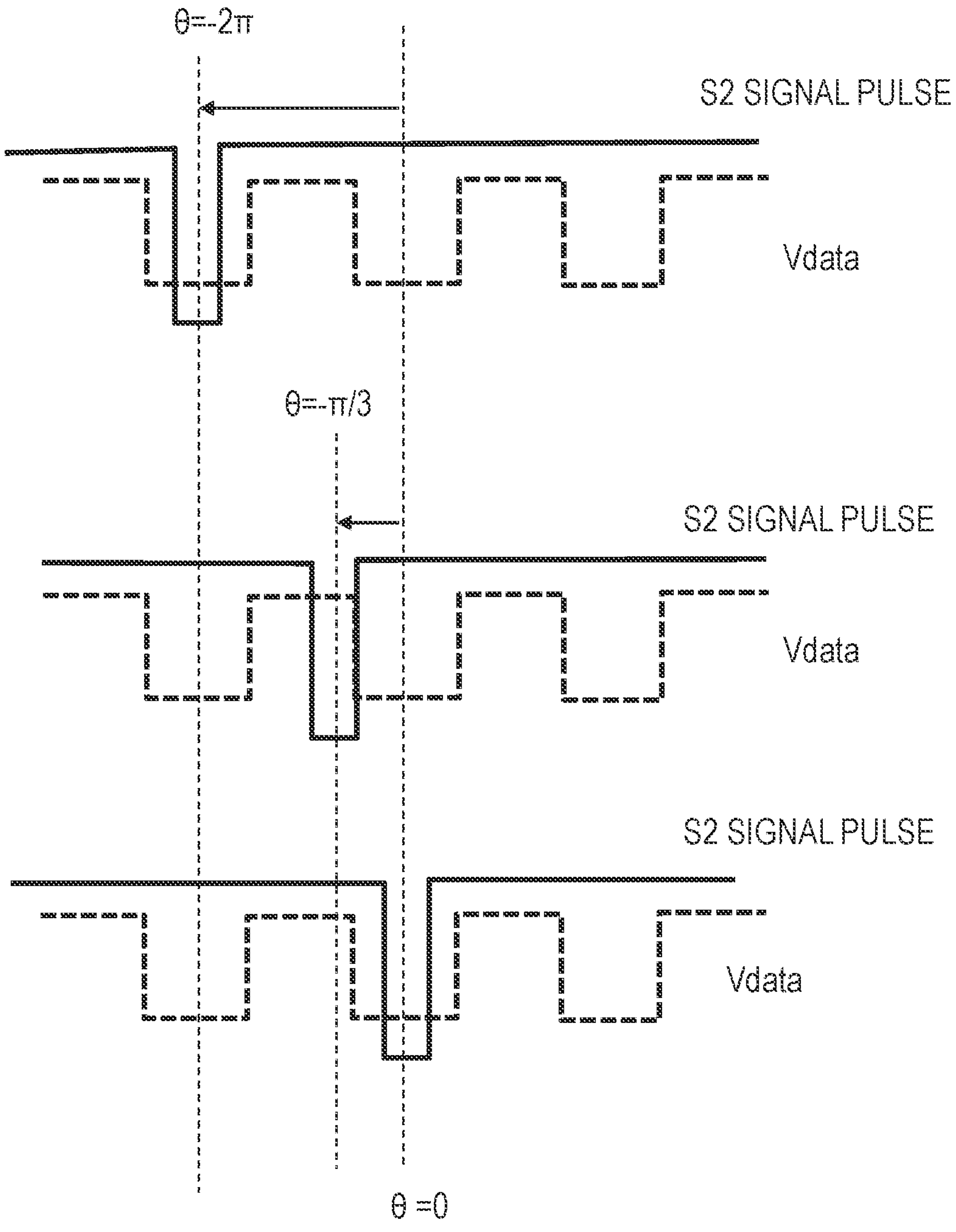
FIG. 18 illustrates examples of the phase difference between a selection signal and a data signal.

FIG. 18 schematically illustrates phase relations between the selection signal S2 and the data signal Vdata. The phase of each signal is defined as the midpoint between the rise and the fall of a pulse (the center in a Low level pulse). The phase difference is defined as positive when the phase of the selection signal S2 is advanced with respect to the phase of the data signal Vdata and as negative when the phase of the selection signal S2 is delayed. FIG. 18 illustrates selection signals S2 and data signals Vdata having phase differences θ of −2π, −π/3, and 0, from the top to the bottom. The phase difference of −2π is the same as the phase difference of 0.

According to the above-described control sequence for a pixel circuit, Vth compensation and data write are performed by time-sharing. In a related example of a pixel circuit including seven transistors and one capacitive element (7T1C pixel circuit), however, Vth compensation and data write are performed simultaneously; the gate voltage Vg of the driving transistor P1 takes time to converge. In this embodiment, Vth compensation is complete at the start of data write; writing a data voltage (video signal) is performed alone. Accordingly, the gate voltage of the driving transistor P1 changes together with the fall of an S2 pulse.

As described above, the related example and this embodiment have a difference in the dependency of the gate voltage on the phase difference. This embodiment has a wide margin for the phase difference and in FIG. 18, and phase difference margin extends on the left. Determining a phase difference within the aforementioned range prevents the data signal for the adjacent line from coming to be mixed in and reduces display defects. The foregoing description about the phase different applies to pixel circuits including n-type transistors.

Figure 19A:
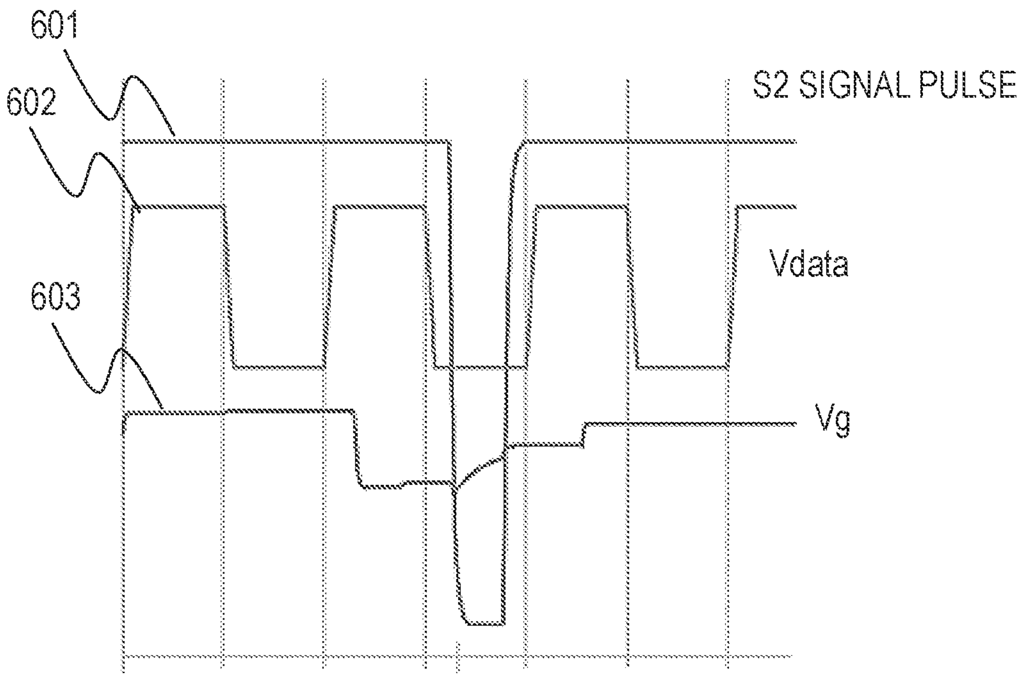
FIG. 19A provides a simulation result of a related example about temporal variations of the gate voltage Vg of the driving transistor, the selection signal S2, and the data signal Vdata.

FIG. 19A provides a simulation result of a related example of a 7T1C pixel circuit about temporal variations of the gate voltage Vg of the driving transistor, the selection signal S2, and the data signal Vdata. The lines 601, 602, and 603 represent temporal variations of the selection signal S2, the data signal Vdata, and the gate voltage Vg, respectively.

Figure 19B:
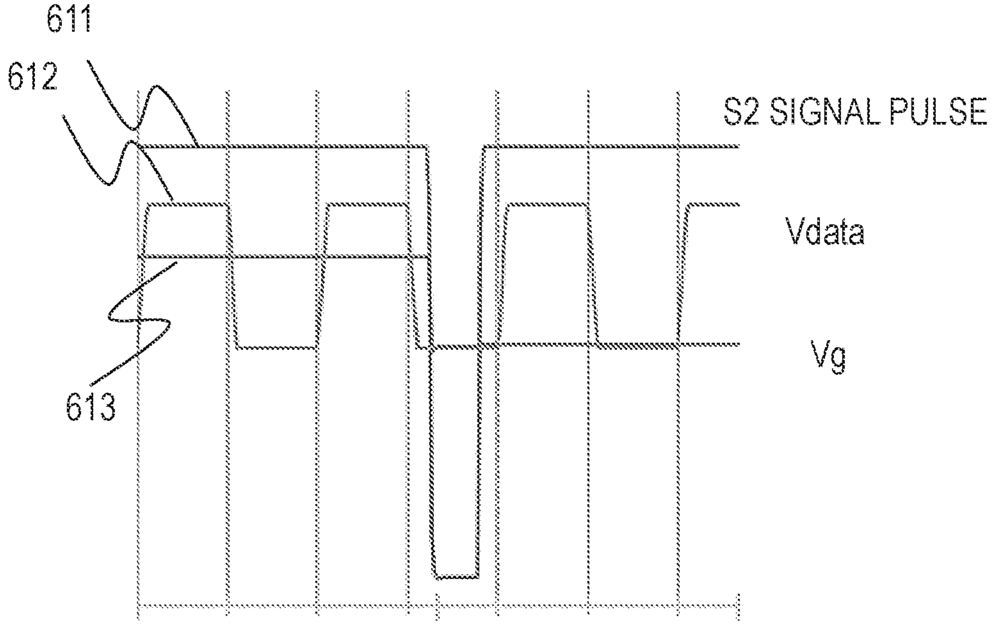
FIG. 19B provides a simulation result of an embodiment of this specification about temporal variations of the gate voltage Vg of the driving transistor, the selection signal S2, and the data signal Vdata.

FIG. 19B provides a simulation result of this embodiment about temporal variations of the gate voltage Vg of the driving transistor, the selection signal S2, and the data signal Vdata. The lines 611, 612, and 613 represent temporal variations of the selection signal S2, the data signal Vdata, and the gate voltage Vg, respectively. Comparing FIG. 19B with FIG. 19A, the gate voltage Vg in this embodiment varies together with the fall of an S2 signal pulse.

Figure 20A:
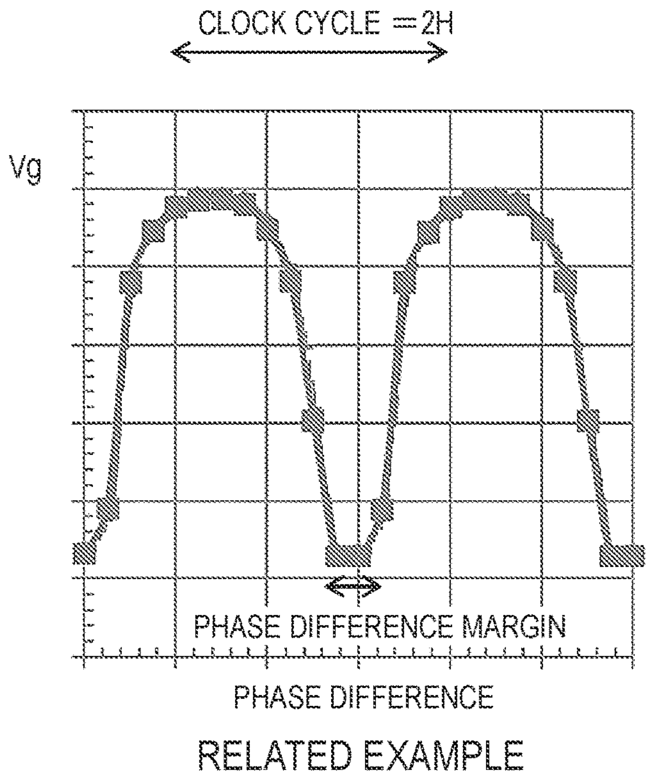
FIG. 20A provides a simulation result of a related example about the dependency of the gate voltage on the phase difference.
Figure 20B:
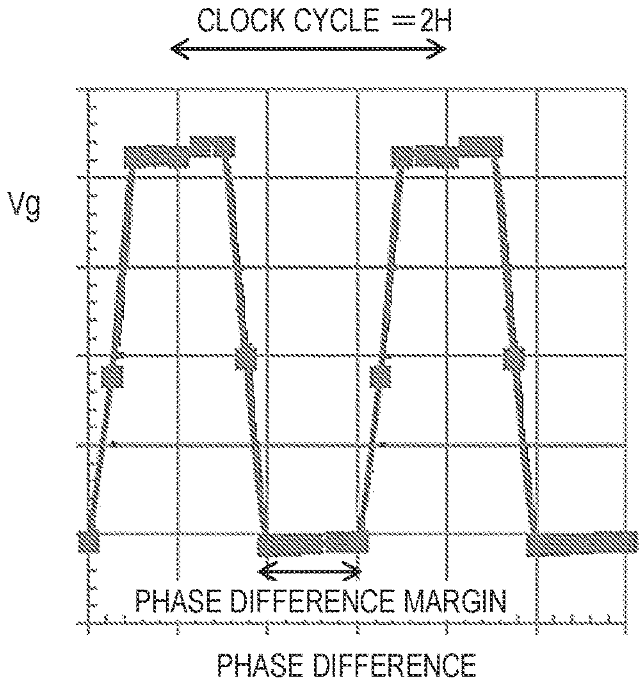
FIG. 20B provides a simulation result of an embodiment of this specification about the dependency of the gate voltage on the phase difference.

FIG. 20A provides a simulation result of a related example of a 7T1C pixel circuit about the dependency of the gate voltage on the phase difference. FIG. 20B provides a simulation result of this embodiment about the dependency of the gate voltage on the phase difference. Comparing FIG. 20B with FIG. 20A, this embodiment has a larger margin for the phase difference.

Next, potentials for the control signals are described. In an embodiment of this specification, the Low potential for the selection signal S1 is determined to be a low value. The selection signal S1 is a control signal for turning ON/OFF the transistors P6, P16, P26, or the like for supplying the reset potential Vrst to the anode of the OLED element E1. Although the following description takes an example of the transistor P6, the same description is applicable to the transistors P16 and P26.

For example, the Low potential Vgl for the selection signal S1 is determined to be not higher than (VEE−6.3) V. If the cathode power supply potential VEE is −2.7 V, the Low potential Vgl for the selection signal S1 is to be not higher than −9 V.

Figure 21A:
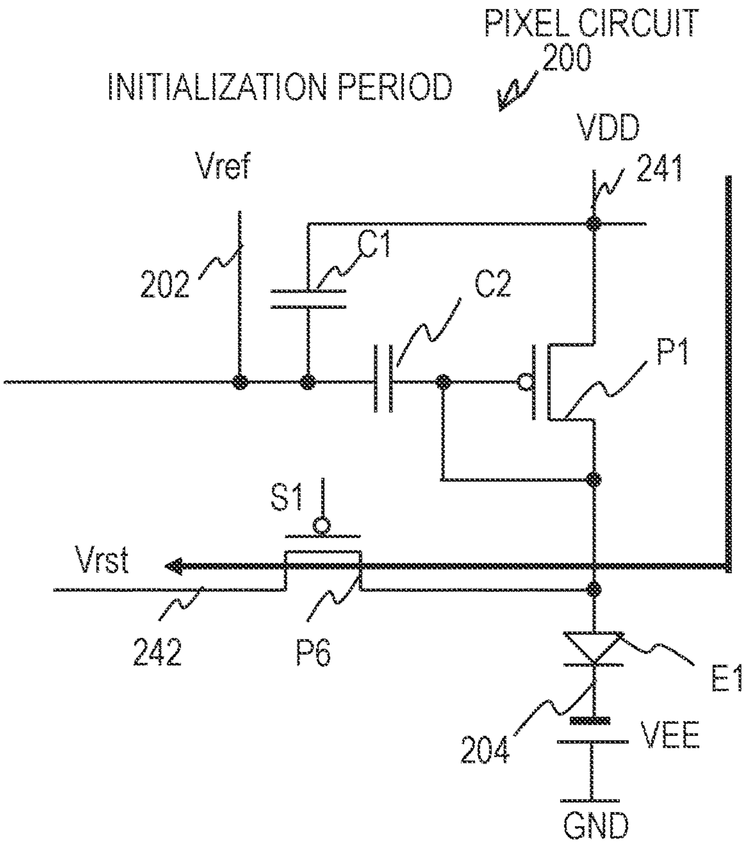
FIG. 21A illustrates the flow of electric current in a pixel circuit in an initialization period.
Figure 21B:
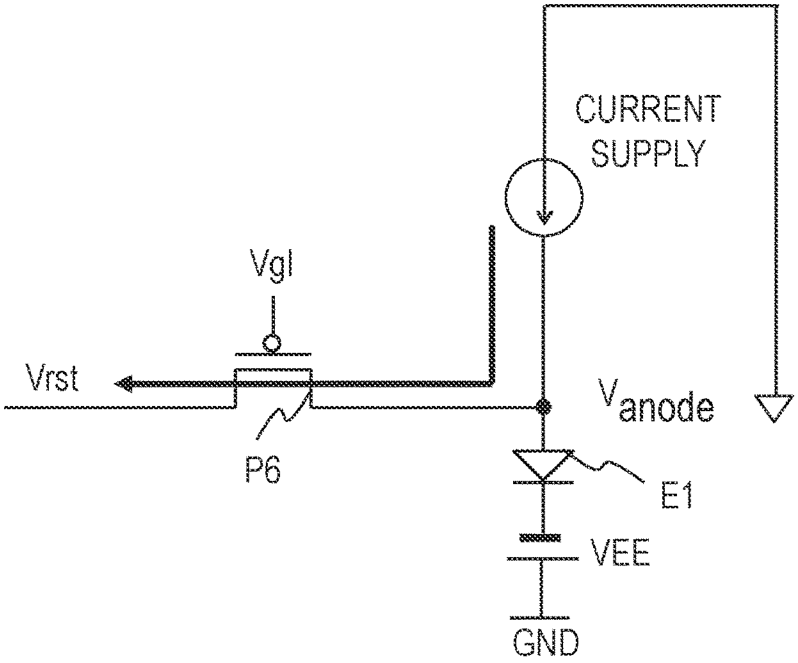
FIG. 21B illustrates an equivalent circuit to the circuit illustrated in FIG. 21A.

FIG. 21A illustrates the flow of electric current in the pixel circuit 200 in an initialization period. Some of the elements are excluded from the illustration. FIG. 21B illustrates an equivalent circuit to the circuit in FIG. 21A. The operation in an initialization period has been described with reference to FIG. 4A. During the initialization period, the current in the transistor P6 is constant and accordingly, the gate-source voltage Vgs of the transistor P6 is constant. Since the source of the transistor P6 and the anode of the OLED element E1 are at the same potential, lowering the Low potential Vgl for the selection signal S1 lowers the anode potential $V_{anode}$ of the OLED element E1 and decreases the voltage of the OLED element E1. The Inventors' experiment revealed that anomalous emission of the OLED element E1 is reduced and the brightness of black is lowered in the initialization period by determining the Low potential Vgl of the selection signal S1 within the aforementioned range.

Instead of lowering the Low potential Vgl for the selection signal S1, lowering the threshold voltage Vth of the transistor P6 works to prevent anomalous emission of the OLED element E1 and lower the brightness of black. The threshold voltage Vth can be defined as Vth=Vgs@Id=1e-7 A, where Id represents the current flowing through the transistor P6. The Inventors' experiment revealed that anomalous emission of the OLED element E1 is reduced and the brightness of black is lowered by determining the threshold voltage Vth of the transistor P6 to be not higher than (VEE−1.3) V. If the cathode power supply potential VEE is −2.7 V, the threshold voltage Vth of the transistor P6 is to be not higher than −4 V.

Figure 22:
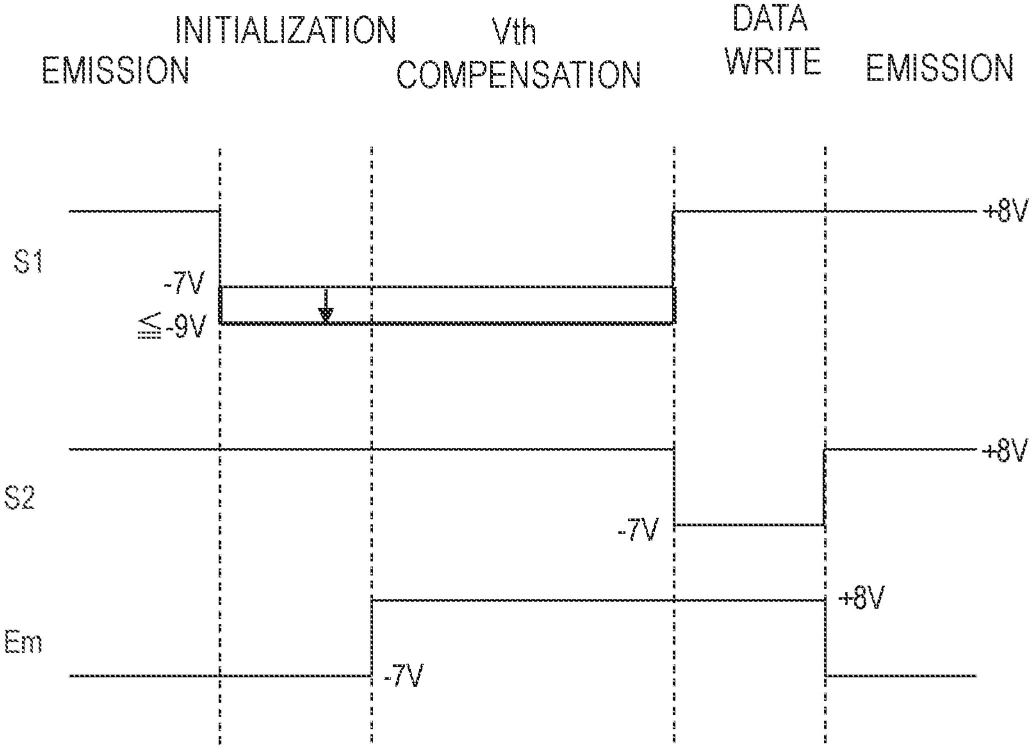
FIG. 22 illustrates examples of the potentials of selection signals and an emission control signal.

FIG. 22 illustrates examples of the potentials of the selection signals S1 and S2 and the emission control signal Em. The High potentials for the selection signals S1 and S2 and the emission control signal Em are 8 V, which is common to all signals. Although the Low potentials for the selection signal S2 and the emission control signal Em are −7 V, the Low potential for the selection signal S1 is determined to be not higher than −9 V.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A pixel circuit configured to control light emission of a light-emitting element, the pixel circuit comprising:

a light-emitting element;

a driving transistor configured to control driving current for the light-emitting element;

a first capacitive element and a second capacitive element connected in series between a gate of the driving transistor and a positive power line;

a first switching transistor configured to switch connection/disconnection between the gate of the driving transistor and a data line;

a second switching transistor configured to switch supply/non-supply of electric current from the positive power line to the driving transistor;

a connection line connecting an intermediate node located between the driving transistor and the second switching transistor and an intermediate node located between the first capacitive element and the second capacitive element;

a third switching transistor configured to switch connection/disconnection between the gate of the driving transistor and a reference power line;

a fourth switching transistor configured to switch supply/non-supply of electric current from the driving transistor to the light-emitting element; and a fifth switching transistor configured to switch connection/disconnection between a reset power line and an intermediate node located between the driving transistor and the fourth switching transistor, wherein, during an initialization period, the first switching transistor is OFF and the second switching transistor, the third switching transistor, the fourth switching transistor, and the fifth switching transistor are ON, wherein, during a threshold compensation period following the initialization period, the third switching transistor and the fifth switching transistor are ON and the first switching transistor, the second switching transistor, and the fourth switching transistor are OFF, wherein, during a data write period following the threshold compensation period, the first switching transistor is ON and the second switching transistor, the third switching transistor, the fourth switching transistor, and the fifth switching transistor are OFF, and wherein, during an emission period following the data write period, the second switching transistor and the fourth switching transistor are ON and the first switching transistor, the third switching transistor, and the fifth switching transistor are OFF.

2. The pixel circuit according to claim 1, wherein the first switching transistor, the second switching transistor, the third switching transistor, the fourth switching transistor, and the fifth switching transistor are p-type thin-film transistors.

3. The pixel circuit according to claim 1, wherein a phase difference θ of a control signal for the first switching transistor with respect to a phase of a signal transmitted by the data line in the initialization period satisfies the following relation:

$$-\pi/3 \leq \theta \leq 0.$$

4. The pixel circuit according to claim 1, wherein the fifth switching transistor is a p-type thin-film transistor, and wherein the following relation is satisfied:

$$Vgl \leq VEE - 6.3\text{V},$$

where Vgl represents a low potential of a control signal for the fifth switching transistor and VEE represents a cathode potential of the light-emitting element.

5. The pixel circuit according to claim 1, wherein the first switching transistor, the third switching transistor, and the fifth switching transistor are n-type oxide-semiconductor thin-film transistors, and wherein the driving transistor, the second switching transistor, and the fourth switching transistor are p-type low-temperature polysilicon thin-film transistors.

6. The pixel circuit according to claim 1 wherein the threshold compensation period is not shorter than 10 μs and not longer than 120 μs.

7. The pixel circuit according to claim 1, wherein the threshold compensation period is not less than three times and not more than forty times as long as the data write period.

* * * * *